(12) United States Patent
Kang et al.

(10) Patent No.: US 12,520,971 B2
(45) Date of Patent: Jan. 13, 2026

(54) BLENDER

(71) Applicant: LG ELECTRONICS INC., Seoul (KR)

(72) Inventors: Dae-yong Kang, Seoul (KR); Jeong-ik Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 863 days.

(21) Appl. No.: 17/846,330

(22) Filed: Jun. 22, 2022

(65) Prior Publication Data

US 2023/0035200 A1 Feb. 2, 2023

(30) Foreign Application Priority Data

Aug. 2, 2021 (KR) .......................... 10-2021-0101164

(51) Int. Cl.
*A47J 43/07* (2006.01)
*A47J 43/046* (2006.01)

(52) U.S. Cl.
CPC ......... *A47J 43/0772* (2013.01); *A47J 43/046* (2013.01); *A47J 43/0727* (2013.01)

(58) Field of Classification Search
CPC .. A47J 43/046; A47J 43/0772; A47J 43/0727; B01F 35/511
See application file for complete search history.

(56) References Cited

U.S. PATENT DOCUMENTS

| | | | |
|---|---|---|---|
| 2008/0037360 A1* | 2/2008 | McGill | A23G 9/224 366/208 |
| 2012/0206995 A1* | 8/2012 | Wu | F16P 3/08 366/205 |
| 2018/0140137 A1* | 5/2018 | Barnard | A47J 43/046 |
| 2020/0297147 A1 | 9/2020 | Ahn et al. | |

FOREIGN PATENT DOCUMENTS

| | | |
|---|---|---|
| KR | 10-2021-0019794 A | 2/2021 |
| WO | 2020063191 A1 | 4/2020 |
| WO | 2020153826 A1 | 7/2020 |

* cited by examiner

*Primary Examiner* — Marc C Howell
(74) *Attorney, Agent, or Firm* — Bryan Cave Leighton Paisner LLP

(57) ABSTRACT

Proposed is a blender which has a pneumatic inspection structure for inspecting whether airtightness is maintained between an outer container body and an inner container body of a container body configured as a double structure. The blender includes the container body in which food is received, a main body provided under the container body and configured to support the container body, and a container lid mounted detachably to an upper surface of the container body and configured to open and close the upper surface of the container body, wherein the container body includes the outer container body constituting an exterior thereof, and the inner container body provided inside the outer container body, wherein space between the outer container body and the inner container body is blocked from the outside and is sealed.

16 Claims, 20 Drawing Sheets

BLENDER

CROSS REFERENCE TO RELATED APPLICATION

The present application claims priority to Korean Patent Application No. 10-2021-0101164, filed Aug. 2, 2021, the entire contents of which are incorporated herein for all purposes by this reference.

BACKGROUND OF THE INVENTION

Field of the Invention

The present disclosure relates generally to a blender. More particularly, the present disclosure relates to a blender which has a pneumatic inspection structure for inspecting whether airtightness is maintained between an outer container body and an inner container body of a container body configured as a double structure.

Description of the Related Art

Generally, a blender is referred to as a mixer or crusher, and is mainly used for crushing or chopping food contained in a container body by rotating blades by the rotation of a motor.

In a normal blender, a main body having a motor operated by electricity is located at the lower side of the blender, and the container body receiving food is seated on the upper side of such a main body. Blades crushing or chopping food are provided inside the container body, and are rotated by the rotational force of the motor.

Accordingly, when a user drives the motor by using a manipulation button or a knob of the main body after putting food in the container body, the blades receiving the rotational force generated by the motor crush or chop food contained inside the container body.

Various types of blenders have recently been developed in accordance with a user's desire to facilitate the food intake of office workers due to their busy daily life. That is, a small hand blender has been developed, and a slightly larger blender has been developed that allows food to be crushed in a large capacity or at high speed.

Furthermore, a vacuum blender which cuts or crushes food by vacuumizing the inside of the container body is also disclosed such that a food material received in the container body of the blender can be processed in a fresher state.

However, what is increasingly emphasized in these various types of blenders is the problem of safe use thereof along with the taste and nutritional problems of food processed by each of the apparatuses. That is, when blades rotate in a state in which a lid is opened, food received in the container body may be thrown out and splattered, and an accident may occur when a child puts a hand in the container body.

Accordingly, a technology for detecting whether a lid is mounted has been developed and is disclosed.

For example, in U.S. Pat. Nos. 6,910,800 and 7,871,196, a push rod which physically connects a container body with a main body is installed, and when a lid is mounted to the container body, the lid presses the push rod.

Specifically, in U.S. Pat. No. 6,910,800, a link is formed vertically long along the side surface of the container body, and when the lid at an upper side of the container body is closed, a protrusion of the lid presses down the upper end of the link such that the lower end of the link is moved downward, so the closing of the lid of the container body can be mechanically detected.

In addition, in U.S. Pat. No. 7,871,196, instead of having a link which transmits the closing of the lid in the vertical direction of the container body on the side surface of the container body, the lid is provided in a handle of the container body. That is, the push rod installed vertically long is installed in a groove formed in the handle, and when the push rod is moved downward due to the closing of the lid from the upper side, a lower switch provided at a lower side is activated by the push rod and detects the lid.

However, in these conventional technologies, a separate push rod or a separate push block is required to be installed, and the link and the push rod formed vertically long are required to match each other in length, so manufacturing and assembly thereof are difficult. Furthermore, due to wear or breakage of the parts caused by frequent use of the associated parts and due to the twisting or bending of the link and the push rod which are substantially long, a detection function may be lost.

In addition, the push rod and a press detection part are required to be separately installed, and moisture may permeate the press detection part or the press detection part may be contaminated due to food, and the push rod of the container body and the press detection part of the main body are required to be installed at positions corresponding to each other, so there is a problem that the container body is required to be mounted only in a specific direction.

Accordingly, to solve these problems, in European Patent No. EP2548485, a blender is disclosed in which when a lid is mounted to the container body, the main body recognizes closing of the lid of the container body by using a wireless communication module.

However, in such a conventional technology, the wireless communication module is required to be provided between the container body and the main body, and a separate power supply (a battery or dry cell) is required to be provided in the container body so as to drive the wireless communication module.

In addition, there is a problem in that communication confusion occurs due to a plurality of communications and an error occurs. That is, wireless power transmission or wireless communication is also required between the main body and an external electrical supply device (a cooktop, etc.). In addition, since it is necessary to transmit whether the lid is detected by wireless communication between the container body and the main body, communication confusion occurs.

Due to these conventional problems, recently, in US patent Application Publication No. US20180020875, an interlocking blender is disclosed in which a pair of transmission and reception coils is disposed in a main body, and a pair of reception and transmission coils corresponding to the coils of the main body is disposed in the container body. When the lid of the container body is closed, power is transmitted to the reception coil of the container body by the transmission coil of the main body, and in turn, power is transmitted to the reception coil of the main body by the transmission coil of the container body such that the main body recognizes the closing of the lid of the container body.

That is, in US patent Application Publication No. US20180020875, a structure is disclosed in which instead of having a push rod installed vertically along the side surface of the container body so as to mechanically transmit the detection signal of the lid to the lower side of the container body, according to the opening or closing of the switch of the upper side of the container body caused by the lid, a circuit connected to the lower part of the container body is closed or opened, so a signal transmission to a base is or is not performed.

However, even in such a conventional technology, two coils, that is, transmission and reception coils are required to be installed in each of the main body and the container body, and a device which analyzes power received by the reception coil of the main body is required, and the problem that malfunction occurs since the lid is not detected properly is constantly being raised.

In addition, electronic parts such as various sensors and a PCB are installed between inner and outer container bodies configured as a double structure or inside a handle and thus water may be introduced thereinto from the outside and malfunction thereof may occur. However, according to the conventional technology, there is no airtightness inspection structure which inspects whether space between the inner and outer container bodies or in the handle in which electronic parts are installed is blocked from the outside, and thus product detects may occur.

Documents of Related Art (Patent Document 1) U.S. Pat. No. 6,910,800
(Patent Document 2) U.S. Pat. No. 7,871,196
(Patent Document 3) European Patent No. EP2548485
(Patent Document 4) US patent Application Publication No. US20180020875

SUMMARY OF THE INVENTION

Accordingly, the present disclosure has been made to solve the above problems occurring in the related art, and the present disclosure is intended to propose a blender in which regardless of the mounting direction of a container lid, the closing of the container lid is accurately detected.

The present disclosure is intended to propose a blender in which space between an outer container body and an inner container body constituting the container body is blocked from the outside and sealed.

The present disclosure is intended to propose a blender which has a pneumatic inspection structure which can inspect whether airtightness is maintained in space in which electronic parts are installed.

In order to achieve the above objectives, according to one aspect of the present disclosure, there is provided a blender in which space between an outer container body and an inner container body constituting a container body is blocked from the outside and maintains airtightness.

In the blender of the present disclosure, space in which electronic parts are installed may be blocked from the outside and may maintain airtightness.

The blender of the present disclosure may be provided with an inspection structure which inspects whether space in which electronic parts are installed is blocked from the outside and maintains airtightness.

The blender of the present disclosure may have a structure which pneumatically can inspect whether space in which electronic parts are installed is blocked from the outside and maintains airtightness.

The blender of the present disclosure includes the container body in which food is received, a main body provided under the container body and configured to support the container body, and the container lid mounted detachably to the upper surface of the container body and configured to open and close the upper surface of the container body.

The container body may include the outer container body constituting an exterior thereof, and the inner container body provided inside the outer container body, wherein space between the outer container body and the inner container body may be blocked from the outside and may be sealed.

A mounting end may be provided on an end of the container body so as to provide space in which a sensor configured to detect whether the container lid is mounted or a PCB is mounted.

The mounting end may be formed by extending laterally from the upper end of the outer container body, and a mounting depression in which a sensor or PCB is mounted may be formed inside the mounting end.

The mounting depression may be configured to be open in an upper side thereof, and the upper side of the mounting depression may be covered by a covering end.

The covering end may be formed by extending laterally from an upper end of the inner container body.

A guide end may be formed on a side of the container body so as to guide the introduction of a fluid from the outside into space between the outer container body and the inner container body.

The guide end may be formed on an end of the container body and may be located inside the mounting end which provides space in which a sensor configured to detect whether the container lid is mounted or a PCB is mounted.

A sealing part may be provided in the guide end so as to block the flow of a fluid through the guide end.

The guide end may be provided on a side of the covering end so as to guide the introduction of a fluid from the outside into the mounting depression.

The guide end may be configured to be stepped and may guide the introduction of a fluid from the upper end of the covering end into the mounting depression.

The guide end may be configured to have a cylindrical shape.

The guide end may include a connecting part formed by extending from the covering end to a side, and an injection part formed by extending to be stepped to a side from the connecting part.

A connection hole into which a connection tube from the outside is inserted may be formed inside the connecting part, and an injection hole may be formed inside the injection part by passing therethrough such that an external fluid introduced through the connection hole flows through the injection hole.

The injection hole may be selectively covered by the sealing part.

The sealing part may include a fastening member fastened to or press-fitted into the injection hole, and a sealing member configured to close a gap between the fastening member and the guide end.

The sealing member may be made of an elastic material.

The fastening member may be configured as a fastening bolt, and a female thread corresponding to a male thread of the fastening bolt may be formed on the injection hole.

The blender of the present disclosure has the following effects.

First, according to the present disclosure, a permanent magnet and a Hall sensor may be used as an on/off means which opens and closes an electric circuit formed in the container body according to whether the container lid is closed, and a light transmission module which generates light and a light reception module which receives light transmitted by the light transmission module may be used as a detection means which determines whether a closed circuit is formed in the container body. Accordingly, in the blender, a magnetic field and light may be used to detect the closing and opening of the container lid, thereby realizing an excellent detection function and a compact configuration, compared to mechanical detection structure.

Second, according to the present disclosure, multiple permanent magnets may be installed at the same intervals on the edge of the container lid, and the Hall sensor may be provided on the upper end of the container body. Accordingly, regardless of the mounting direction of the container lid, magnetism of each of the permanent magnets may be easily detected by the Hall sensor, thereby accurately detecting the closing of the container lid.

Third, according to the present disclosure, space between the outer container body and the inner container body may be blocked from the outside. Accordingly, electronic parts provided inside the container body may be protected from external foreign matter (water, etc.), thereby preventing malfunction.

Fourth, the blender of the present disclosure may be provided with a structure in which air is injected into an inner space in which electronic parts are installed so as to inspect whether airtightness is maintained by pneumaticity. Accordingly, product defects may be prevented.

Fifth, the blender of the present disclosure may be provided with a pneumatic inspection structure which inspects airtightness by injecting air into space in which electronic parts are installed, and the guide end constituting the pneumatic inspection structure may be provided with the sealing inspecting airtightness part. Accordingly, after by pneumaticity, an air inlet may be closed by the sealing part, thereby preventing the introduction of foreign matter such as external water through the guide end.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a blender of the present disclosure will be described in detail with reference to the accompanying drawings.

Figure 1:
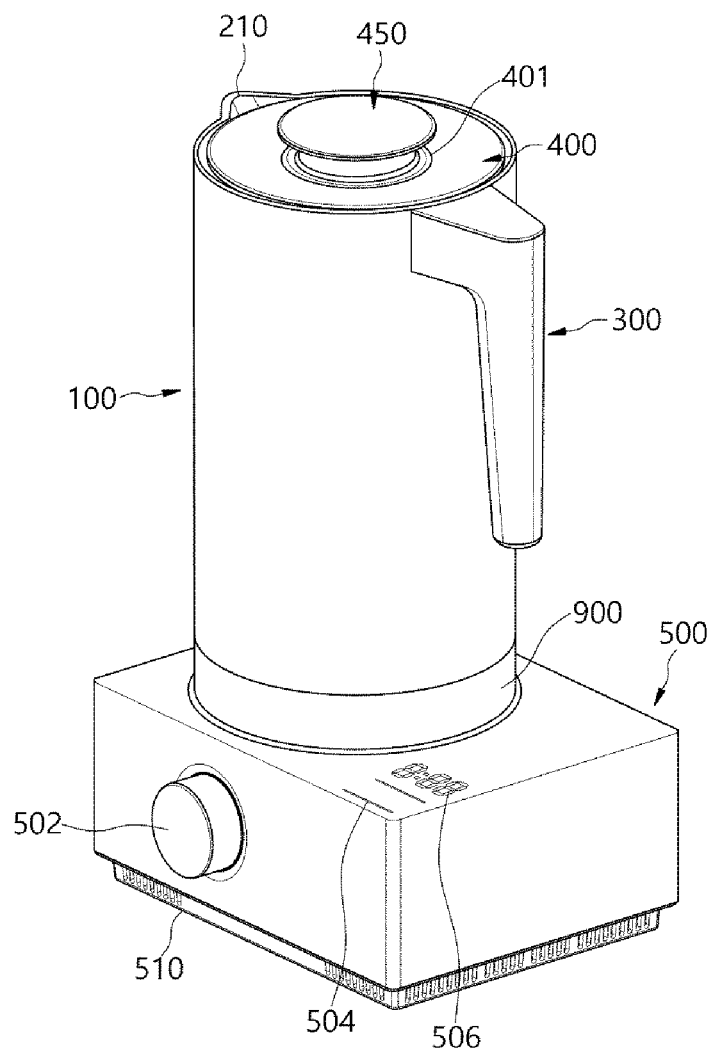
FIG. 1 is a perspective view illustrating the configuration of the blender of the present disclosure according to an exemplary embodiment.
Figure 2:
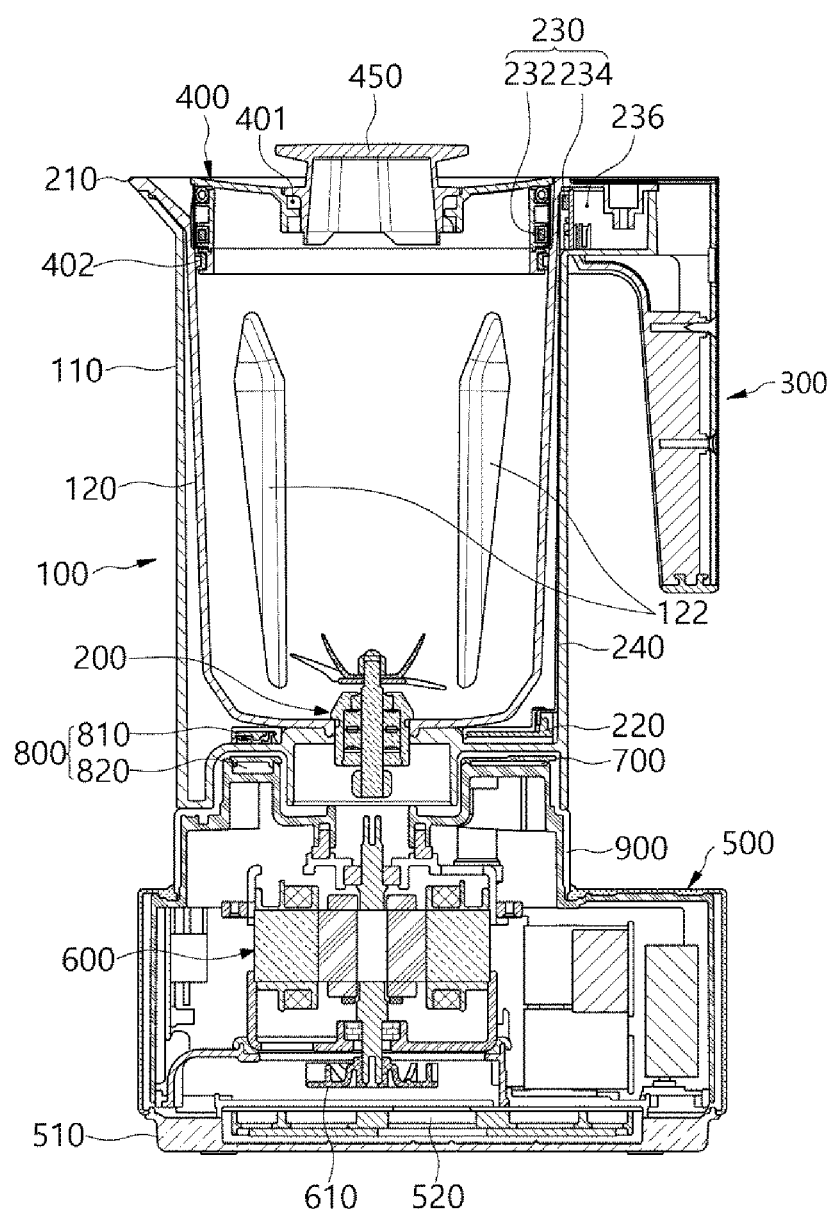
FIG. 2 is a vertical sectional view illustrating the internal configuration of the blender of the present disclosure.

FIGS. 1 and 2 illustrate a perspective view and a vertical sectional view, respectively, showing the configuration of the blender according to an embodiment of the present disclosure.

As illustrated in these drawings, the blender of the present disclosure may include a container body 100 located at an upper side thereof so as to receive food, and a main body 500 provided at the lower side of the container body 100 so as to support the container body 100.

The container body 100 may be a part in which food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and an upper surface thereof may be configured to be open to introduce food thereinto.

The container body 100 may be made of a transparent material such that the inside thereof can be seen from the outside. That is, the container body 100 may be made of glass or transparent plastic such that a user can check the state of food contained inside the container body 100 from the outside.

A blade assembly 200 may be provided in the inner lower part of the container body 100. The blade assembly 200 may have multiple blades (206 of FIG. 3) mounted rotatably thereto such that the blades chop or crush food received in the container body 100.

The blade assembly 200 may be connected to a motor assembly 600 to be described below, and be configured to be rotated by a rotational force generated by the motor assembly 600.

The container body 100 may be configured to have a double structure. That is, the container body 100 may be composed of an outer container body 110 constituting appearance thereof and an inner container body 120 provided inside the outer container body 110. The outer container body 110 and the inner container body 120 may be configured to be in contact with each other or to be spaced apart by a predetermined distance from each other. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide food rotating in the container body 100, and may be configured in pairs symmetrical to each other in the front and rear or left and right of the inner container body 120.

A handle 300 gripped by a user may be formed on the right surface of the container body 100 by protruding therefrom to the right side. Such a handle 300 may be configured such that a user can grip the handle with his or her one hand, and in the present disclosure, the upper end of the handle is illustrated to be connected integrally to the upper surface of the container body 100.

Meanwhile, a spout 210 may be formed at a side opposite to the handle 300.

As illustrated in FIG. 2, the spout 210 may be formed on the upper end of the left surface of the container body 100, and may be a part through which food completely crushed in the container body 100 is guided to be easily poured to the outside. Accordingly, such a spout 210 may be configured to protrude upward more gradually in the left direction.

The upper surface of the container body 100 may be covered by a container lid 400. That is, the container lid 400 may be detachably mounted to the upper surface of the container body 100, and open and close the upper surface of the container body 100.

The container lid 400 may cover the upper surface of the container body 100 such that food contained in the container body 100 is not removed to the outside and foreign matter of the outside is not introduced into the container body.

The container lid 400 may be configured to be mounted to the container body 100 by pressing or rotating the container lid 400 by a user. A gasket 402 may be provided in the outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 to cover the lid hole 401.

As illustrated in FIG. 2, the cap 450 may be installed at the center of the container lid 400, and as a whole, may be configured to have a diameter smaller than the diameter of the container lid 400. The cap 450 may be removably mounted to the container lid 400 by forcible fitting by pressing or by rotating.

In the present disclosure, it is illustrated that the cap 450 is configured to be attached to and detached from the container lid 400 by being rotated, and a detailed configuration thereof will be described below.

Since the cap 450 may be removably mounted to the container lid 400, a user may see food contained inside the container body 100 by opening only the cap 450 without opening the container lid 400, and insert food into the container body 100 by opening the cap 450, or insert a mixing rod thereinto and stir the food contained inside the container body 100 by using the mixing rod.

The upper end of the cap 450 may be formed by protruding toward a side upper than the upper end of the container lid 400, so the cap 450 may function as the handle of the container lid 400 gripped by a user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB may be mounted inside the main body 500. Of course, the external shape of such a main body 500 may be variously changed as required.

The motor assembly 600 may be provided at the center of the inside of the main body 500. The motor assembly 600 may generate a rotational force by power supplied from the outside such that the blades (206 of FIG. 3) constituting the blade assembly 200 rotate.

Accordingly, the lower end of the blade assembly 200 may be connected to the upper end of the motor assembly 60.

A knob 502 may be provided on the front surface of the main body 500 by protruding forward therefrom. The knob 502 is intended to preset the operation of the blender of the present disclosure, and may be rotatably mounted to the main body 500.

The knob 502 may be configured to control the intensity of the operation of the motor assembly 600. That is, the knob 502 may be configured to change the rotational speed of the motor assembly 600 to high speed or low speed by the clockwise or counterclockwise rotation of the knob 502.

Meanwhile, a touch manipulation part 504 may be provided on the upper surface of the main body 500.

The touch manipulation part 504 is intended to manipulate the blender of the present disclosure by touching, and may be configured to manipulate the starting and stopping of the blender.

Of course, the knob 502 and the touch manipulation part 504 may be configured to selectively preset or manipulate the operation of the blender, or may be configured to overlap each other in the functions of the presetting and manipulating. That is, for convenience, the knob 502 and the touch manipulation part 504 may be configured to have functions overlapping each other such that a user may select any one of the knob 502 and the touch manipulation part 504 to preset or manipulate the operation of the blender.

A display part 506 may be provided at a side of the touch manipulation part 504 (a left side of FIG. 1). That is, the display part 506 may be provided on the upper surface of the main body 500. Such a display part 506 may function to display the state of the operation of the blender such that a user can check the state thereof. Accordingly, such a display part 506 may be configured as a seven-segment display.

A cooling fan 610 may be provided at the lower side of the motor assembly 600.

The cooling fan 610 may be connected to the lower end of the motor assembly 600 and be rotated by a rotating force generated by the motor assembly 600, thereby introducing external air into the main body 500 and forcing the air to be discharged back to the outside. Accordingly, the cooling fan 610 may allow external air to be introduced into the main body 500 and then be discharged to the outside, and thus function to cool parts such as the PCB provided inside the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More specifically, the detection system may include: a power transmission means 700 provided in the main body 500 and configured to supply power to the container body 100; a power reception means 220 provided in the container body 100 and configured to receive the power supplied by the power transmission means 700; an on/off means 230 provided at the upper side of the container body 100 and configured to turn on/off the electric circuit formed in the container body 100 depending on whether the container lid 400 is closed; a transparent electrode film 240 made of a transparent material provided on a surface of the container body 100 and connecting the power reception means 220 and the on/off means 230 to each other so as to allow electricity to flow therebetween; and a detection means 800 provided on one side of the main body 500 or the container body 100 and allowing the electric circuit formed by the connection of the power reception means 220 with the on/off means 230 to form a closed circuit so as to detect whether electric current flows.

The power transmission means 700 is intended to transmit power, which is introduced into the main body 500 from the outside of the main body 500 or is prestored in the main body 500, to the container body 100, and may use an induction coil in which induced electromotive force can be generated.

The power reception means 220 is intended to receive the power transmitted from the main body 500, and may be configured to have a structure corresponding to the structure of the power transmission means 700. That is, the power reception means 220 may use a coil such that power is transmitted thereto by induced electromotive force generated between the power transmission means 700 and the power reception means 220.

The power transmission means 700 and the power reception means 220 may be located to be adjacent to each other so as to generate induced electromotive force. Accordingly, in the present disclosure, the power transmission means 700 is mounted to the right upper end of the main body 500, and the power reception means 220 is mounted to the right lower end of the container body 100.

The on/off means 230 may be configured to turn on/off the electric circuit (not shown) formed in the container body 100 depending on whether the container lid 400 is mounted to the container body 100, and may include a permanent magnet 232 and a Hall sensor 234 provided respectively in the container lid 400 and the container body 100.

As illustrated in FIG. 2, in the present disclosure, the permanent magnet 232 is mounted to the edge of the container lid 400, and the Hall sensor 234 is mounted to the right upper end (a portion of the handle) of the container body 100.

More specifically, the Hall sensor 234 may be installed to be received in a mounting depression 236 formed in the upper end portion of the handle 300.

Of course, except for the use of the permanent magnet 232 and the Hall sensor 234 as such an on/off means 230, other electric on/off means or mechanical structures may be used to turn on/off the electric circuit.

The Hall sensor is a transistor that detects electric and electronic magnetic fields and is often used to measure the intensity or distribution of the magnetic fields. That is, the Hall sensor uses Hall effect and is used in various ways, such as measuring the rotational speed of a motor or the position of a camshaft, so a further detailed description thereof will be omitted here.

Meanwhile, instead of the Hall sensor 234, a magnetism detection sensor such as a reed switch may be used. It is widely known that the reed switch has magnetic movable contacts enclosed in a glass tube, and when a magnet approaches the reed switch, the contacts in the glass tube contact with each other. Here, further detailed description of the reed switch will be omitted.

In addition, the installation positions of the permanent magnet 232 and the Hall sensor 234 installed respectively on the container lid 400 and the container body 100 may be reversed. That is, according to the present disclosure, multiple permanent magnets 232 are installed at the same intervals on the edge of the container lid 400, and the Hall sensor 234 is installed on a side of the upper end of the container body 100. However, the multiple permanent magnets 232 may be installed at the same intervals on the edge of the upper end of the container body 100, and at least one Hall sensor 234 may be installed on the container lid 400.

Various types of electrical devices or structures having a function in which whether electric current flows in the electric circuit formed in the container body 100 turned on/off by the on/off means 230 can be detected may be used as the detection means 800. However, in the present disclosure, a photosensor is used to detect light as an example.

Accordingly, the detection means 800 may include a light transmission module 810 provided in the container body 100 to generate light, and a light reception module 820 provided in the main body 500 to receive light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may use an LED that emits light by electricity, and the light reception module 820 may use the photosensor that receives light and converts the light into an electrical signal.

Furthermore, the transparent electrode film 240 may be provided between the outer container body 110 and the inner container body 120. More specifically, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off means 230 provided on the upper side of the container body 100 to be connected to the power reception means 220 and the light transmission module 810 provided on the lower end portion of the container body 100 so as to form an electric circuit.

Accordingly, the transparent electrode film 240 may be attached vertically and longitudinally to the surface of the container body 100 made of a transparent material and may function to guide the transmission of an electrical signal between the upper and lower ends of the container body 100.

Accordingly, when the container body 100 is made of a transparent material, and the transparent electrode film 240 is also made of a transparent material, the transparent electrode film 240 may not be visually exposed, so the appearance of the container body 100 may not be damaged to maintain the design thereof.

In addition, when the transparent electrode film 240 is attached to the surface of the container body 100, the transparent electrode film 240 may have a hole formed therein to remove air bubbles that may be generated between attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to the shape of the lower end of the container body 100, so that the lower end of the container body 100 may be mounted to the seating step 900 to be vertically removed therefrom.

Furthermore, the container body 100 may be configured as a double structure. That is, the container body 100 may be composed of the outer container body 110 and the inner container body 120, and the inner guides 122 may be formed on the inner surface of the inner container body 120 by protruding inward therefrom.

Hereinafter, the configuration of the container body 100 will be described in detail.

Figure 3:
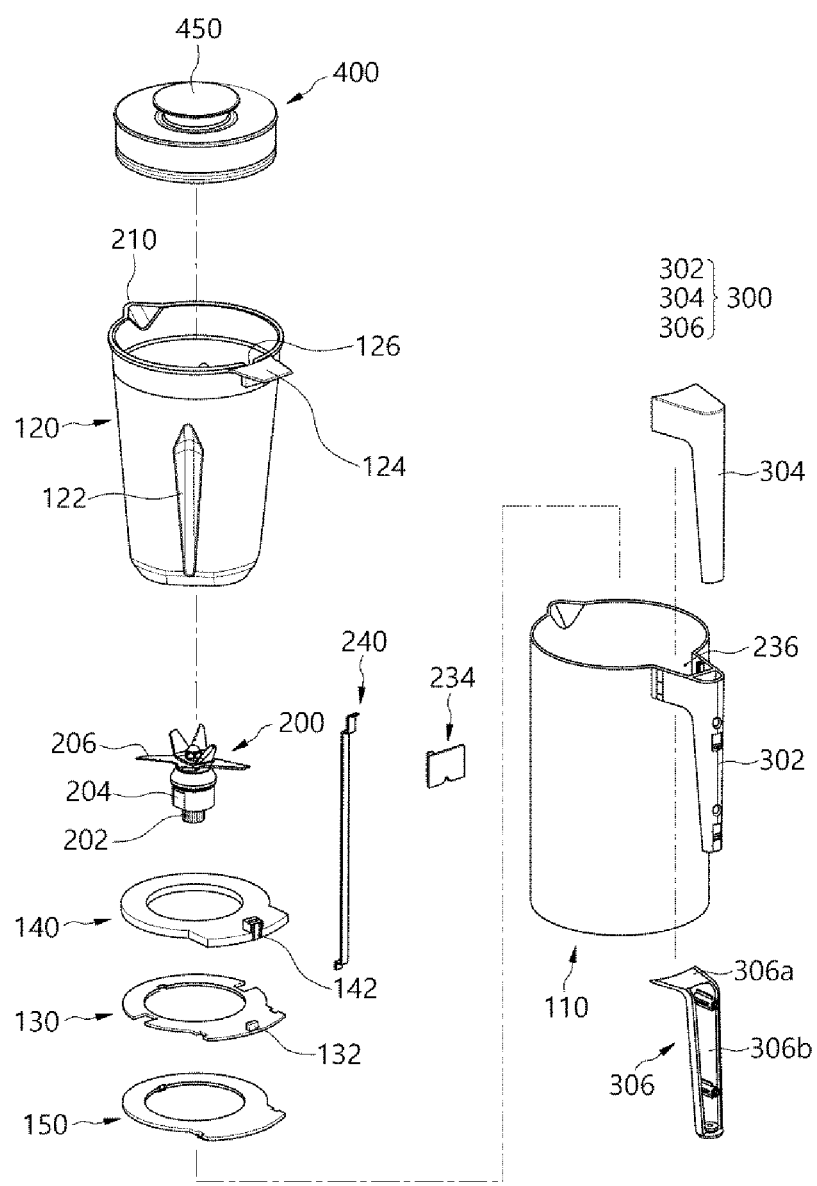
FIG. 3 is an exploded perspective view illustrating the detailed configuration of a container body constituting the blender of the present disclosure according to the embodiment.
Figure 4:
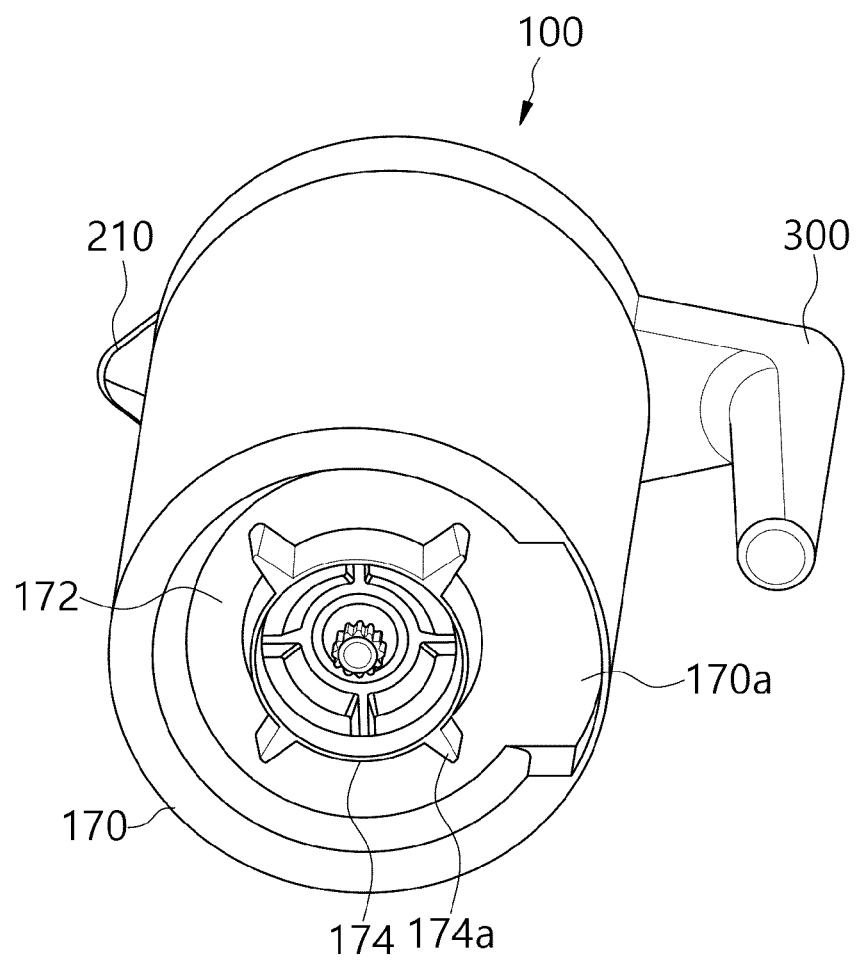
FIG. 4 is a bottom perspective view of the container body constituting the blender of the present disclosure according to the embodiment.

FIG. 3 illustrates an exploded perspective view of the container body 100, and FIG. 4 illustrates a bottom perspective view of the container body 100.

As illustrated in these drawings, the container body 100 may be configured as a double structure having a cylindrical shape as a whole. That is, the container body 100 may include the outer container body 110 constituting an appearance thereof, and the inner container body 120 provided inside the outer container body 110.

The container body 100, that is, each of the outer container body 110 and the inner container body 120 may be made of a transparent material. That is, the container body 100 may be made of a transparent material such as glass, Tritan, or transparent plastic such that a user can check the state of food contained inside the container body 100 from the outside.

The outer container body 110 may constitute the appearance of the container body, and be configured to have a cylindrical shape with the same top and bottom sizes, and a main handle 302 may be formed on the outer right surface of the outer container body 110 by protruding therefrom to the right such that a user can grip the main handle.

The main handle 302 may be formed to have an L shape, and an upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to a main handle formed as a part separate from the outer container body 110 to be fixed thereto.

A mounting end 235 having a predetermined space may be provided inside a part on which the main handle 302 is connected to the container body 100, and the mounting depression 236 in which the Hall sensor 234 or PCB (not shown) is mounted may be formed inside such a mounting end 235. That is, the mounting end 235 which is open in an upper end may be formed on the upper end of the main handle 302 and may allow the main handle 302 to be connected to the outer container body 110 of the container body 100, and the mounting depression 236 may be formed inside such a mounting end 235 and may provide space in which the Hall sensor 234 or PCB (not shown) is mounted.

Specifically, the mounting end 235 may be provided on the right upper end of the outer container body 110 by bending rightward and extending, and the mounting depression 236 having space of a predetermined size may be formed inside such a mounting end 235 and may provide space in which the Hall sensor 234 or PCB (not shown) is received. Additionally, the upper end of the mounting end 235 may be covered by a covering end 124 formed integrally with the inner container body 120. That is, the open upper side of the mounting depression 236 which is the inner space of the mounting end 235 may be covered by the covering end 124 to be described below such that the mounting depression 236 is blocked from the outside.

An outer handle 304 and an inner handle 306 may be provided respectively on the outer and inner sides of the main handle 302. That is, as illustrated in FIG. 3, the outer handle 304 may be provided at the right of the main handle 302, and the inner handle 306 may be provided at the left of the main handle 302.

More specifically, the outer handle 304 may also be configured to have an L shape as a whole as does the main handle 302, and to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape corresponding to the shape of the left and lower surfaces of the main handle 302, and at least a portion of the inner handle may be made of an elastic material.

Specifically, the inner handle 306 may include a connection part 306a covering the lower part of the upper end of the main handle 302, and a gripping part 306b extending downward from the connection part 306a and covering the left surface of the main handle 302.

Like the outer handle 304, the connection part 306a may be made of a smooth and strong material, and the gripping part 306b may be a part covered by a user's fingers, and be made of an elastic material. That is, the connection part 306a may be made of stainless steel, and the gripping part 306b may be made of an elastic material such as rubber that can give a user a soft touch since the four fingers (except for the thumb) of the user cover the gripping part.

The inner container body 120 may be configured to have size (a diameter) smaller than the size (a diameter) of the outer container body 110 and may be seated inside the outer container body 110.

The inner container body 120 may be configured to have a cylindrical shape having an open upper part. More specifically, as illustrated in FIG. 3, the inner container body 120 may be configured to have a tapered shape having a diameter gradually decreasing toward the lower side thereof.

Furthermore, as described above, the multiple inner guides 122 may be vertically formed on the inner surface of such an inner container body 120, and the blade assembly 200 may be mounted to the lower end of the inner container body 120.

The spout 210 may be formed on the left upper end of the inner container body 120 by protruding therefrom to the left, and a covering end 124 may be formed on the right upper end of the inner container body 120 by extending therefrom to the right.

The covering end 124 may cover the upper surface of the mounting depression 236 of the outer container body 110. The covering end 124 may be configured as a flat plate having a predetermined thickness and to have width gradually decreasing toward the right to correspond to the size of the upper end of the mounting depression 236.

The blade assembly 200 may be mounted to the lower end of the inner container body 120.

The blade assembly 200 may allow food to be finely crushed or mixed by the blades, and may include: a blade shaft 202 rotated by receiving rotational power from the motor assembly 600; a blade body 204 provided at the outer side of the blade shaft 202 and supporting the blade shaft 202; and at least one blade 206 rotated by being connected to the blade shaft 202 so as to crush food.

The permanent magnet 232 may be mounted on the edge of the container lid 400. When the container lid 400 is mounted to or removed from the container body 100, the permanent magnet 232 is intended to control the turning on/off of the Hall sensor 234.

A coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Specifically, the coil holder 130 may be provided between the bottom surface of the outer container body 110 and the lower surface of the inner container body 120, and the power reception means 220 and the light transmission module 810 may be mounted to such a coil holder 130.

The entirety of the coil holder 130 may have the shape of a circular ring having a predetermined thickness, and the power reception means 220 may be provided at the right end of the coil holder 130 having such a ring shape. That is, although not shown in detail, an induction coil which receives power may be provided at the right end of the coil holder 130, and constitute the power reception means 220.

The power reception means 220 mounted to the coil holder 130 may be embodied with a reception induction coil patterned on the same plane as the PCB. That is, in the power reception means 220 according to the embodiment of the present disclosure, the reception induction coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception means 220. The light transmission module 810 may be configured as a part of the detection means 800, and use an LED emitting light as described above.

The power reception means 220 and the light transmission module 810 may be electrically connected to each other. That is, the power reception means 220 and the light transmission module 810 may be configured to form a closed circuit in cooperation with the on/off means 230. Accordingly, the power reception means 220 and the light transmission module 810 provided in the coil holder 130, and the on/off means 230 may be configured to be electrically connected to each other by the PCB.

Furthermore, although not shown, the coil holder 130 may further include a conversion module that converts an alternating current (AC) to a direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to have a relatively large width such that the power reception means 220 can be mounted thereto.

Multiple grooves may be formed in the outer and inner circumferential surfaces of the coil holder 130 such that hooks for fixing multiple parts pass through the multiple grooves.

The coil holder 130 may be protected by the upper and lower covers 140 and 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be configured to be partially open such that the lower end of the transparent electrode film 240 passes therethrough.

A hook may be formed on the upper cover 140 such that the upper cover 140 is coupled to the lower cover 150.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from being in contact with food contained in the inner container body 120, and may be prevented from being in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, each of the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the Hall sensor 234.

A film guide 160 to which the transparent electrode film 240 is attached may be formed vertically on the inner surface of the outer container body 110. That is, the film guide 160 may be formed vertically and longitudinally on the right inner surface of the outer container body 110 and may guide the attachment of the transparent electrode film 240.

A magnet groove 464 may be formed in the upper end of the inner container body 120 by being recessed therefrom to the outside such that the permanent magnet 232 is received in the magnet groove 464. That is, the upper end of the right surface of the inner container body 120 may be bent to be stepped to the right so as to form the magnet groove 464, and such a magnet groove 464 may be a part in which the permanent magnet 232 is located.

Meanwhile, the lower surface of the container body 100 may be configured to have a shape corresponding to the shape of the upper surface of the main body 500 such that the container body 100 is easily attached to and detached from the upper surface of the main body 500.

More specifically, the container body 100 may be mounted to the seating step 900 of the main body 500 to be described below.

Accordingly, the lower surface of the container body 100 may be configured to have a shape corresponding to the shape of the upper end of the main body 500, so the container body 100 may be stably mounted to and easily removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open to form a coil seating part groove 170a. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, and may provide a passage connecting the blade assembly 200 to the motor assembly 600.

The circular end 174 may be a part received in a circular end receiving groove 980 formed in the main body 500 to be described below.

Multiple mounting protrusions 174a may be formed on the outer circumferential surface of the circular end 174 by protruding radially therefrom. Each of the mounting protrusions 174a may function to tightly mount the container body 100 to the corresponding position of the main body 500 such that the container body 100 is held without being rotated. The mounting protrusion 174a may include at least one mounting protrusion.

In the present disclosure, the mounting protrusion 174a is illustrated to include four mounting protrusions 174a. As illustrated in FIG. 4, such a mounting protrusion 174a may be formed to have thickness gradually decreasing toward the outside. This is intended to easily receive the mounting protrusions 174a in protrusion grooves 982 to be described below.

Figure 7:
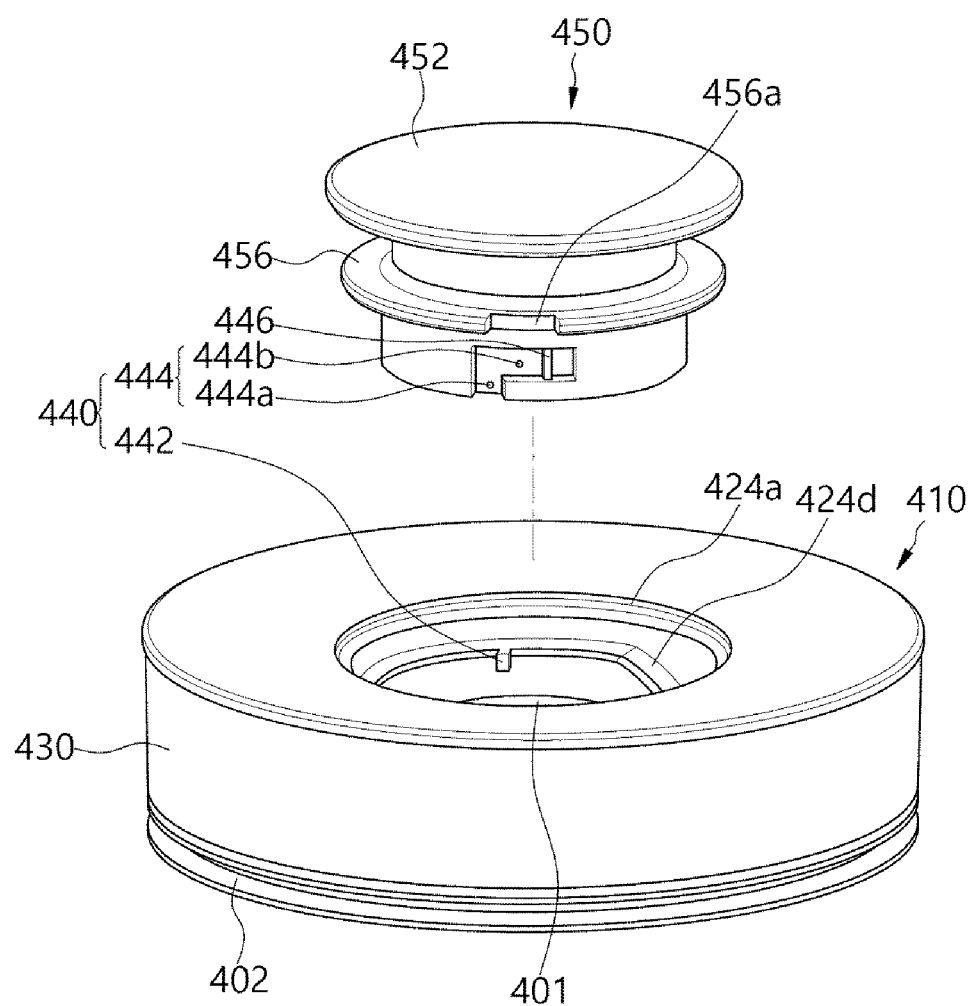
FIG. 7 is a top exploded perspective view illustrating the configuration of the container lid constituting the blender according to the embodiment.
Figure 8:
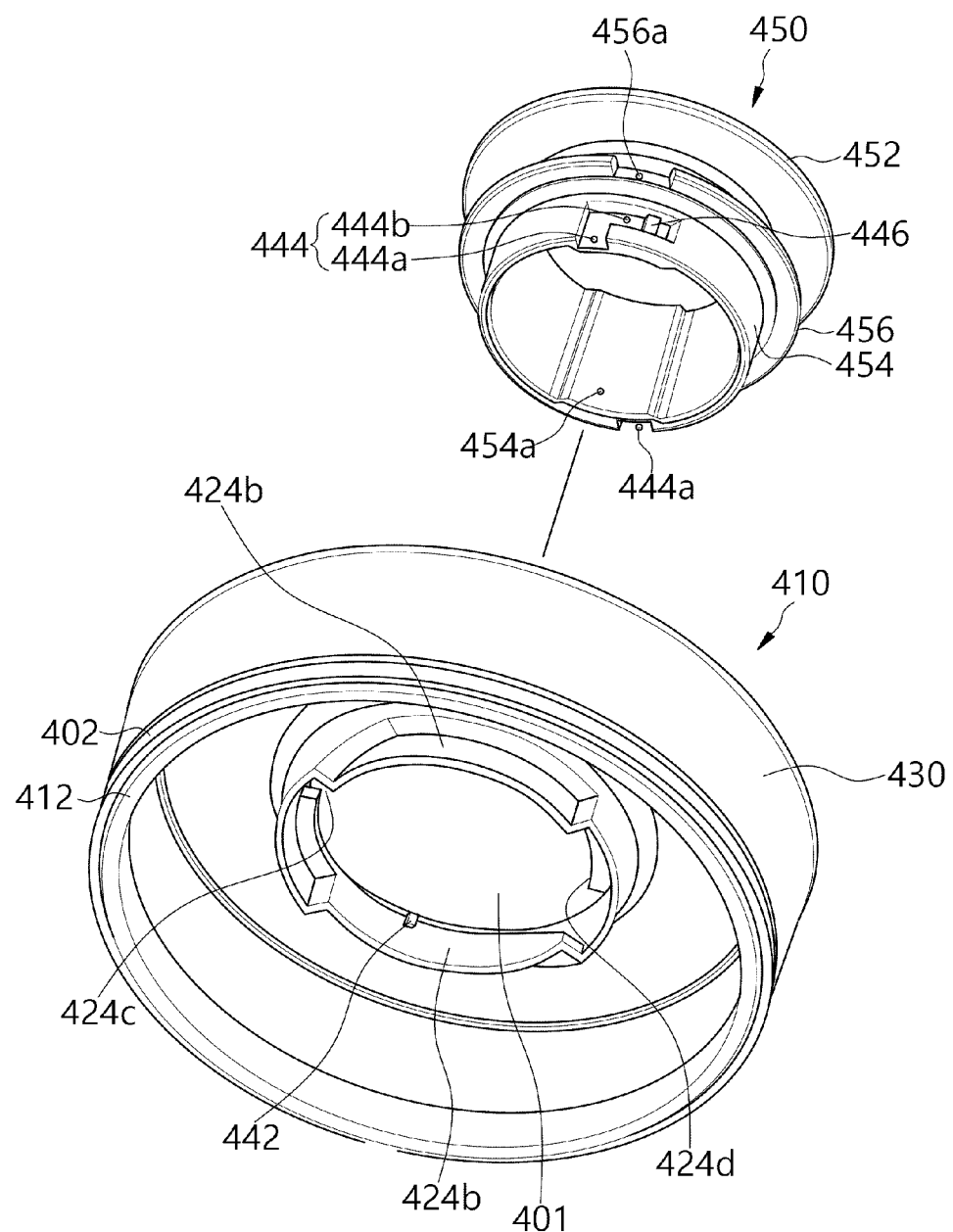
FIG. 8 is a bottom exploded perspective view illustrating the configuration of the container lid constituting the blender according to the embodiment.
Figure 9:
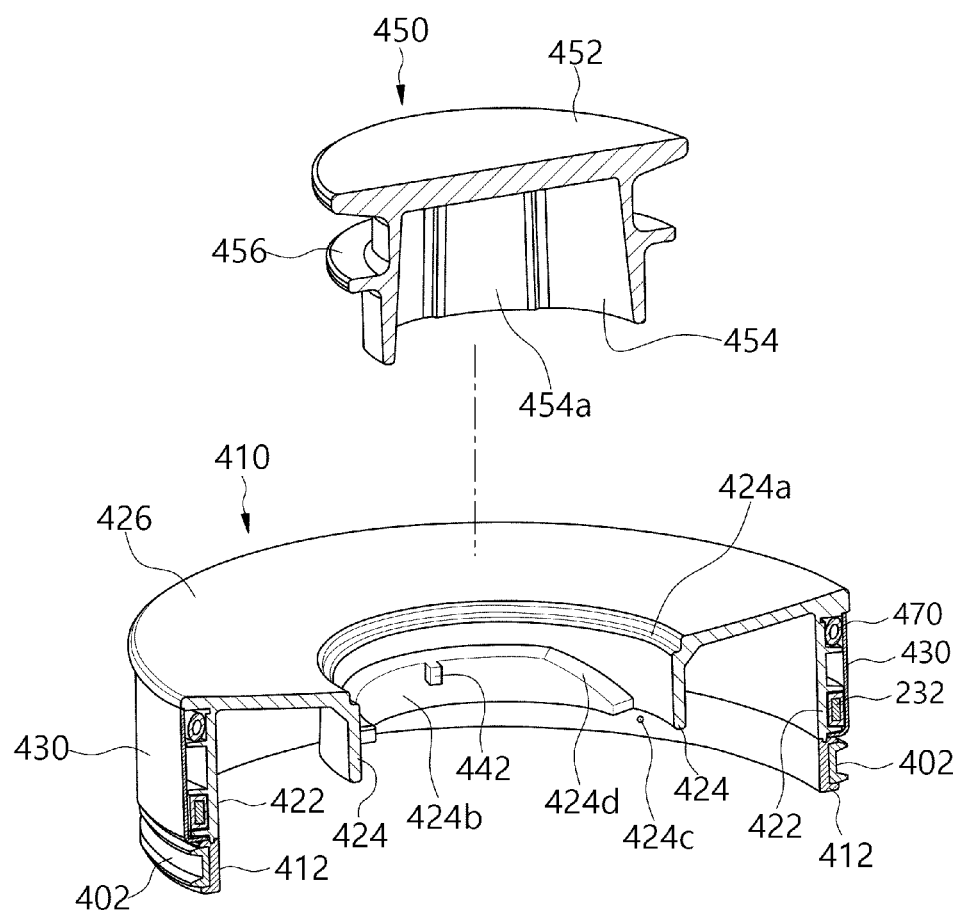
FIG. 9 is a cut-away exploded perspective view illustrating the internal configuration of the container lid constituting the blender according to the embodiment.
Figure 10:
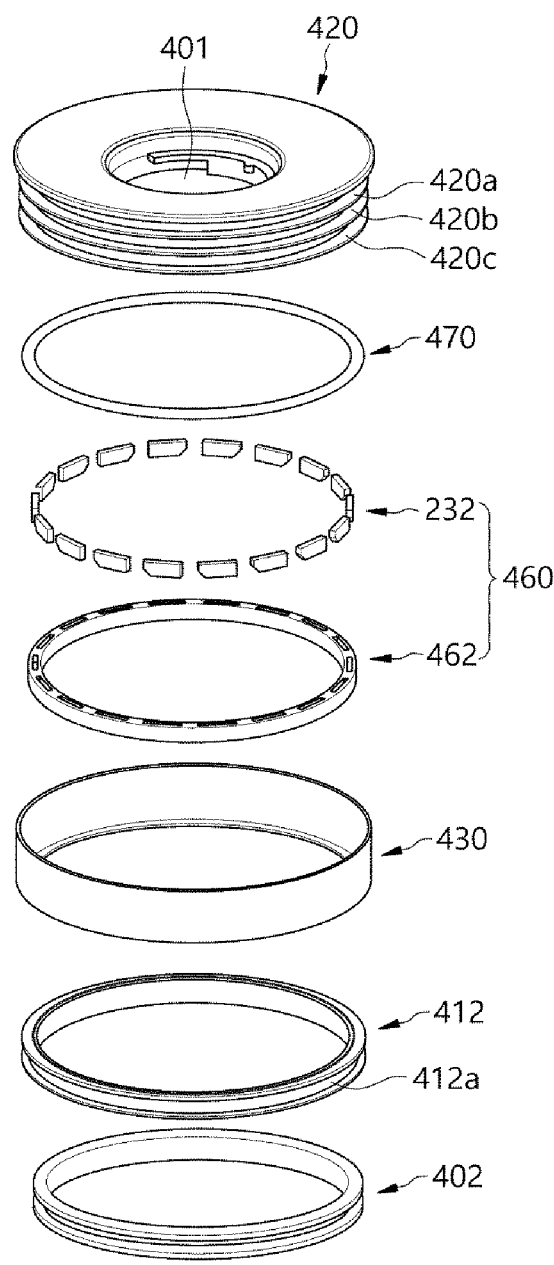
FIG. 10 is an exploded perspective view illustrating the configuration of a lid body constituting the blender according to the embodiment.
Figure 11:
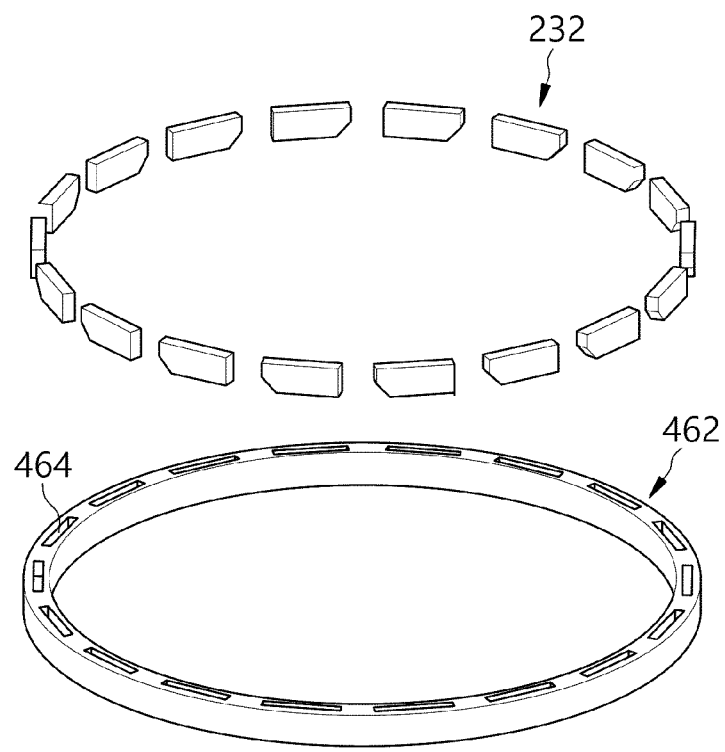
FIG. 11 is an exploded perspective view illustrating the configuration of a magnet assembly constituting the blender according to the embodiment.
Figure 12:
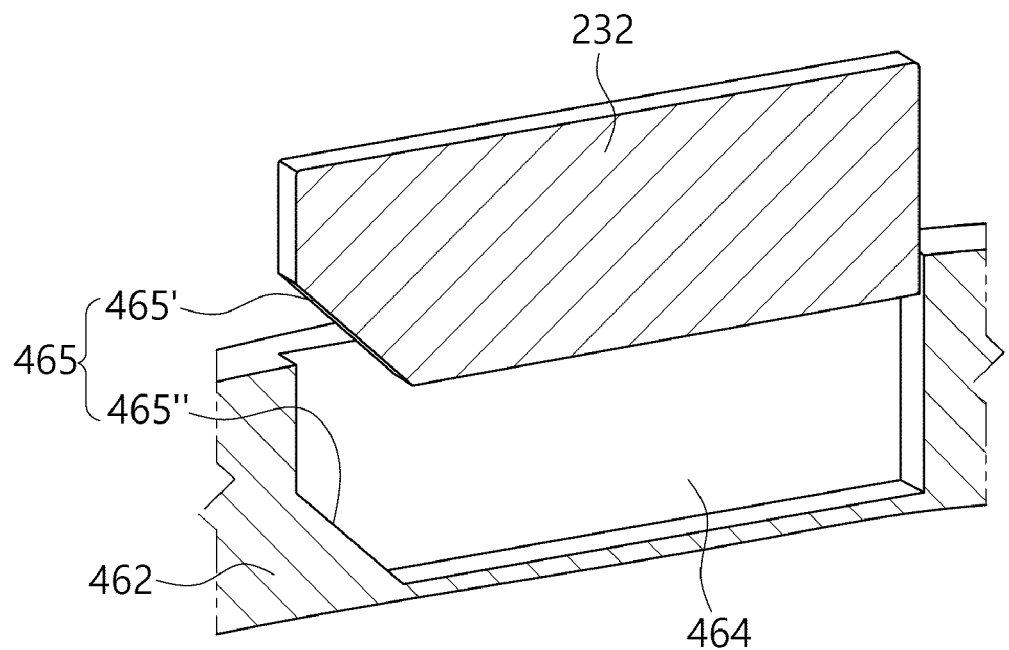
FIG. 12 is a partially enlarged sectional view illustrating a state in which the permanent magnet constituting the blender of the present disclosure is inserted into a magnet groove of a magnet holder.
Figure 13:
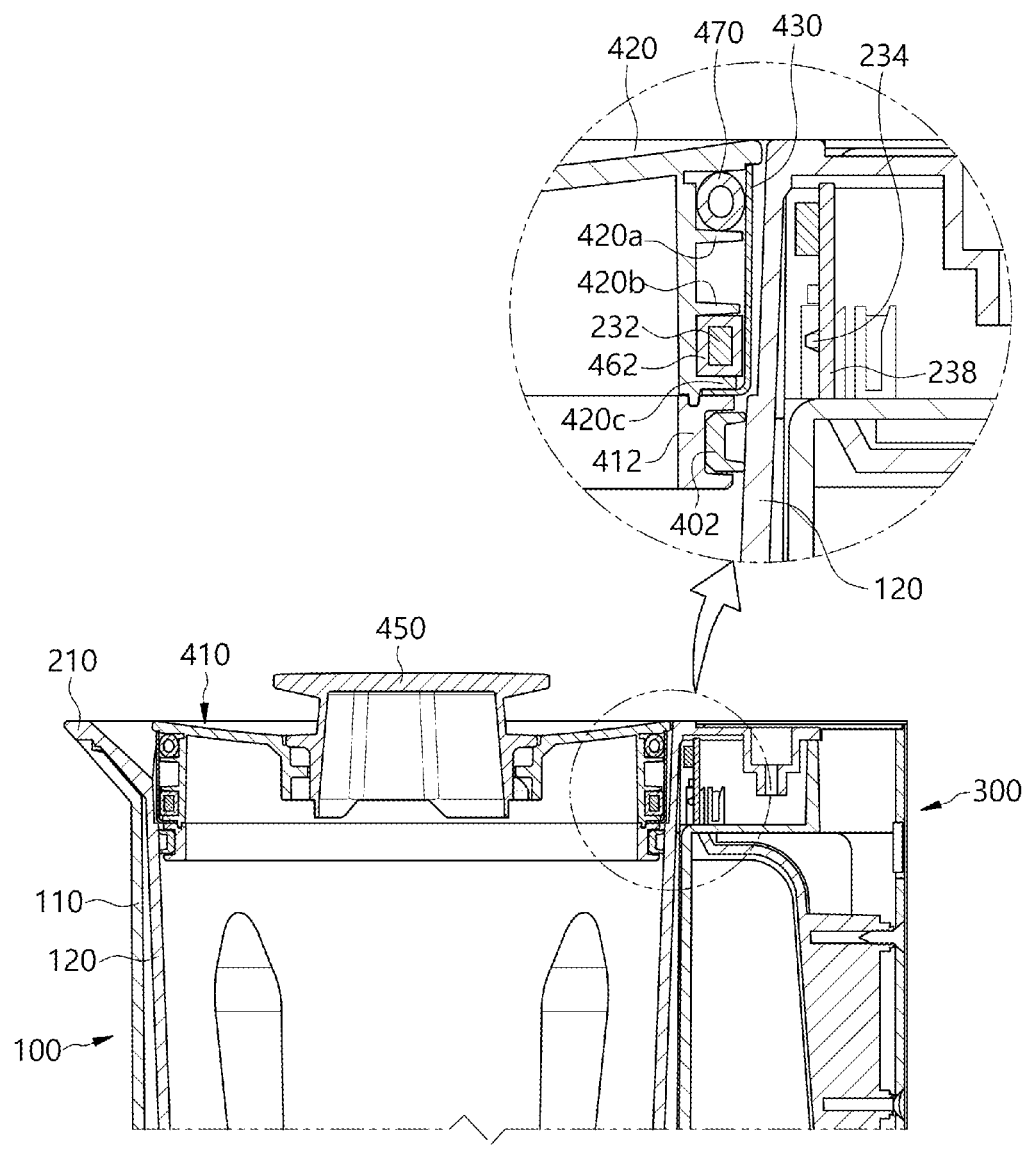
FIG. 13 is a partial front sectional view illustrating the installed states of the permanent magnet and a Hall sensor constituting the blender of the present disclosure according to the embodiment.
Figure 14:
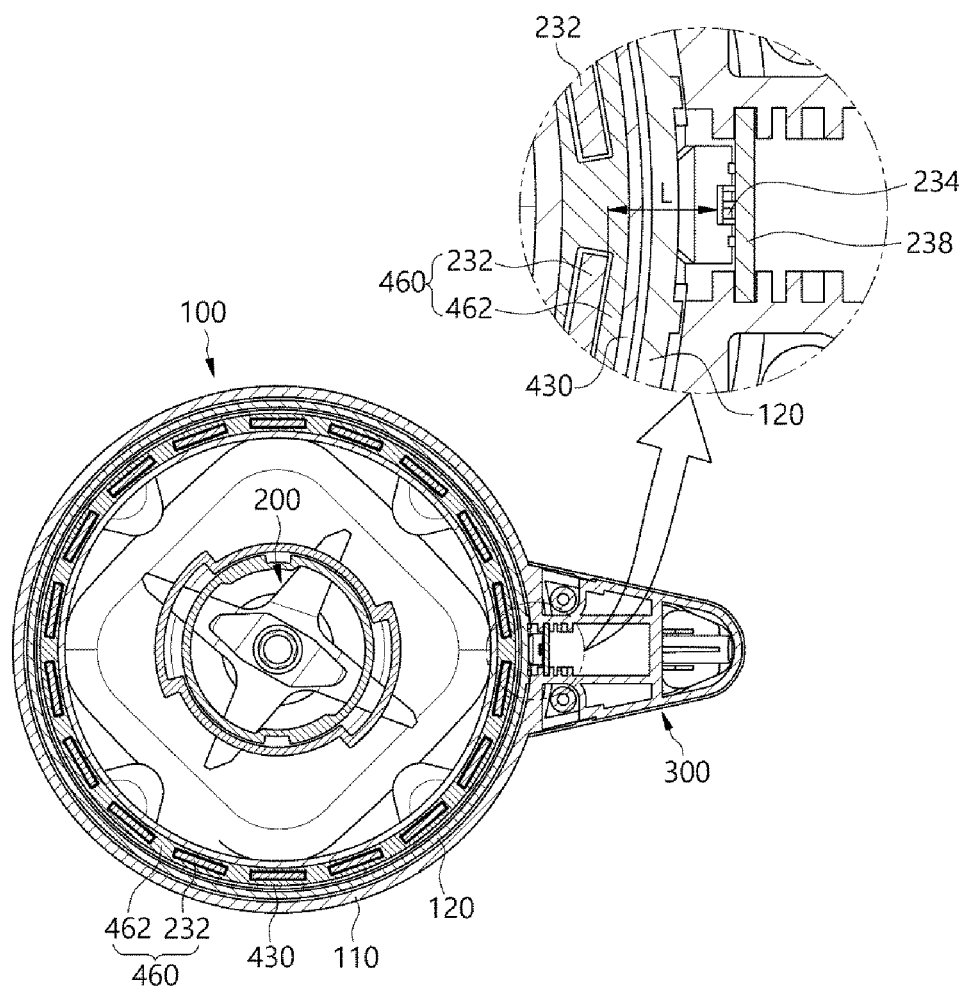
FIG. 14 is a partial top sectional view illustrating the installed states of the permanent magnet and the Hall sensor constituting the blender of the present disclosure according to the embodiment.

FIGS. 5 to 14 illustrate the container lid 400, and the detailed configuration of the container lid 400 mounted to the container body 100. That is, FIGS. 5 and 6 respectively illustrate a perspective view and a cut-away perspective view of the container lid 400, FIGS. 7 and 8 respectively illustrate exploded perspective views of the upper and lower sides of the container lid 400, and FIG. 9 illustrates a cut-away exploded perspective view of the container lid 400. FIG. 10 illustrates an exploded perspective view of the lid body 410 of the container lid 400, FIG. 11 illustrates an exploded perspective view of the configuration of a magnet assembly 460 constituting the blender of the present disclosure according to the embodiment, FIG. 12 is a partially enlarged sectional view illustrating a state in which the permanent magnet 232 is inserted into the magnet groove 464 of a magnet holder 462. Furthermore, FIGS. 13 and 14 are a partial front sectional view and a partial top sectional view, respectively, illustrating the installed states of the permanent magnet 232 and the Hall sensor 234 constituting the blender of the present disclosure according to the embodiment.

As illustrated in these drawings, the container lid 400 may include the lid body 410 having the lid hole 401 formed vertically therethrough, the cap 450 configured to cover the lid hole 401, and a locking means 440 which allows the cap 450 to be mounted detachably to the lid body 410.

Specifically, the lid body 410 may be configured to have a shape of a circular ring, and may have the lid hole 401 formed vertically through an inner center part thereof. Furthermore, the cap 450 may be mounted detachably to such a lid hole 401 so as to cover the lid hole 401.

The lid body 410 may include the lid casing 420 having the lid hole 401 formed vertically through a center part of the lid casing, and the lid exterior material 430 covering the side surface of the lid casing 420.

Multiple side ribs 420a, 420b, and 420c may be formed on the side surface of the lid casing 420 by protruding therefrom to the outside (laterally) such that the lid exterior material 430 and the lid casing 420 can be coupled to each other. The multiple side ribs 420a, 420b, and 420c may support the permanent magnet 232 and a sealing packing 470 such that the permanent magnet 232 and the sealing packing 470 to be described below are installed on the edge of the side surface of the container lid 400.

The side ribs 420a, 420b, and 420c may include multiple side ribs. Each of these multiple side ribs 420a, 420b, and 420c may have space having a predetermined size such that the permanent magnet 232 or the sealing packing 470 can be seated in the space.

Figure 6:
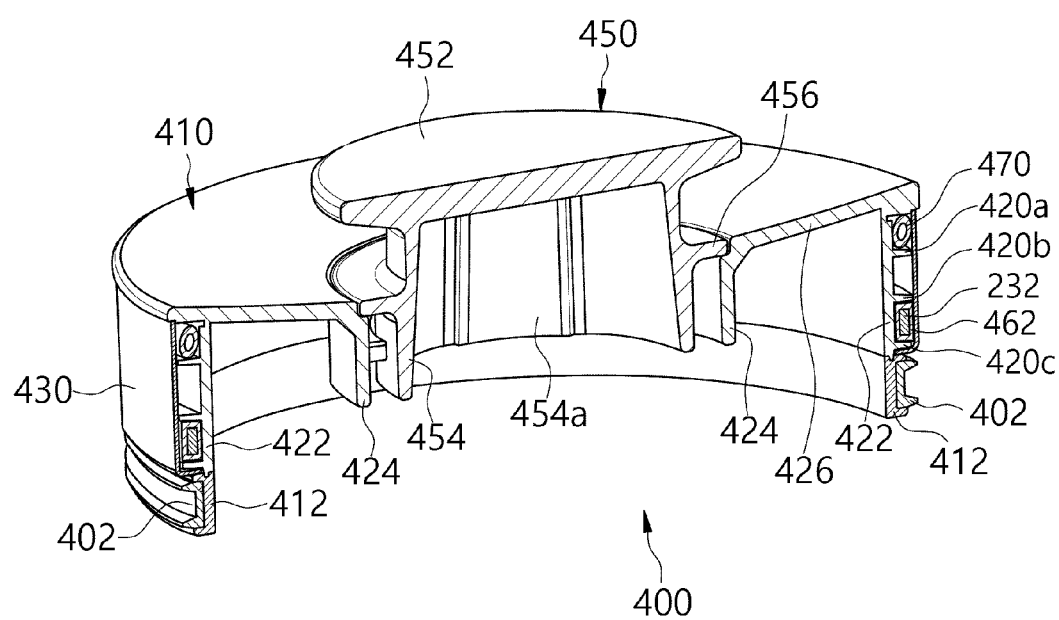
FIG. 6 is a cut-away perspective view illustrating the internal configuration of the container lid constituting the blender according to the embodiment.

As illustrated in FIG. 6, the side rib 420a, 420b, or 420c may include multiple side ribs formed at the same vertical intervals on the side surface of the lid casing 420. That is, the side ribs 420a, 420b, and 420c may include a first rib 420a formed to be spaced by a predetermined interval apart downward from the upper end of the container lid 400, a second rib 420b formed to be spaced by a predetermined interval apart downward from the first rib 420a, and a third rib 420c formed to be spaced by a predetermined interval apart downward from the second rib 420b.

In the blender of the present disclosure, the third rib 420c is illustrated to be formed on the lower end of the lid casing 420.

Meanwhile, the side ribs 420a, 420b, and 420c may protrude from the side surface of the lid casing 420 to the outside, so the lid exterior material 430 and the lid casing 420 may be coupled to each other by forcible fitting.

The lid casing 420 may constitute the approximate appearance and overall frame of the lid body 410. Such a lid casing 420 may have the lid hole 401 therein vertically formed therethrough and having a diameter of a predetermined size.

In addition, the lid exterior material 430 may be coupled to the outer surface of the lid casing 420 such that the appearance thereof has high quality and looks beautiful to a consumer. That is, the lid casing 420 may be made of plastic by injection molding, and the lid exterior material 430 may be made of stainless steel.

Accordingly, the lid exterior material 430 may be made of a material such as stainless steel which has a smooth surface and is resistant to rust.

The lid exterior material 430 may be coupled to the outer circumferential surface (a side surface) of the lid casing 420 by the adhesive or by forcible fitting. Accordingly, as illustrated in the drawings, the multiple side ribs 420a, 420b, and 420c may be formed at the same intervals on the outer circumferential surface (the side surface) of the lid casing 420 by protruding therefrom to the outside.

The lid casing 420 may include: an outer wall 422 configured to have the shape of a circular ring and to constitute the appearance thereof; an inner wall 424 configured to have a diameter smaller than the diameter of the outer wall 422 and to have the lid hole 401 formed therein; and an upper surface 426 connecting the upper ends of the outer wall 422 and the inner wall 424 to each other.

Specifically, the lid casing 420 may, as a whole, have the shape of a circular ring being hollow thereinside and having a predetermined width. That is, the lid casing 420 may have the lid hole 401 vertically formed through the center of the inside thereof, and may have the structure of a circular ring having a U-shaped section.

The container lid 400 is intended to cover the upper surface of the container body 100, and the lid hole 401 may be formed in the center of the container lid 400 by being vertically formed therethrough, and the cap 450 may be removably mounted to the lid hole 401. That is, as illustrated in the drawing, a hole may be formed in the center of the container lid 400 by being vertically formed therethrough and may constitute the lid hole 401, and the cap 450 may cover such a lid hole 401.

The gasket 402 blocking the gap between the container lid 400 and the container body 100, and a support ring 412 fixedly supporting the gasket 402 may be provided on a side of the lid body 410.

Accordingly, the support ring 412 and the gasket 402 having circular ring shapes may be provided on the lower side of the lid body 410. The support ring 412 may be fixed to the lower end of the lid body 410 by adhesive, and the gasket 402 may be in close contact with and coupled to the outer surface of the support ring 412.

More specifically, the support ring 412 may be fixedly coupled to the lower side of the outer wall 422, and the gasket 402 may be installed to be in close contact with the outer surface of the support ring 412.

A support groove 412a may be formed in the outer surface of the support ring 412 by being recessed inward therefrom, and the gasket 402 may be received in and coupled to such a support groove 412a.

The gasket 402 may function to block a gap between the container lid 400 and the container body 100, and to prevent the container lid 400 closing the container body 100 from being naturally removed from the container body 100.

Accordingly, the gasket 402 may be made of an elastic material, and as illustrated in the drawing, at least one rib may protrude on the outer circumferential surface of the gasket to form a corrugated shape.

The cap 450 may be composed of an upper plate 452 exposed to the upper side of the lid body 410, and a cap body 454, at least a portion of which is received in the lid hole 401.

As illustrated in the drawings, the cap body 454 may be configured to have the shape of a truncated cone or a cylinder having a hollow inner portion as a whole. That is, the cap body 454 may be configured to have the shape of a truncated cone gradually decreasing in diameter upward or the shape of a cylinder having the same top and bottom diameters.

The upper plate 452 may cover the upper surface of the cap body 454 having a predetermined height, and as illustrated in the drawings, may be configured to have a diameter larger than the diameter of the upper end of the cap body 454.

A middle ring 456 may be formed on the cap body 454 by protruding therefrom to the outside, and may be in contact with the inner surface of the upper end of the lid hole 401.

Specifically, the middle ring 456 may be formed by protruding from the middle or upper end of the cap body 454 to the outside, and when the cap 450 is mounted to the lid body 410, the middle ring 456 may constitute the same plane as the upper surface 426 of the lid body 410. Accordingly, the upper surface of the middle ring 456 may be exposed to the upper side of the lid body 410.

Figure 5:
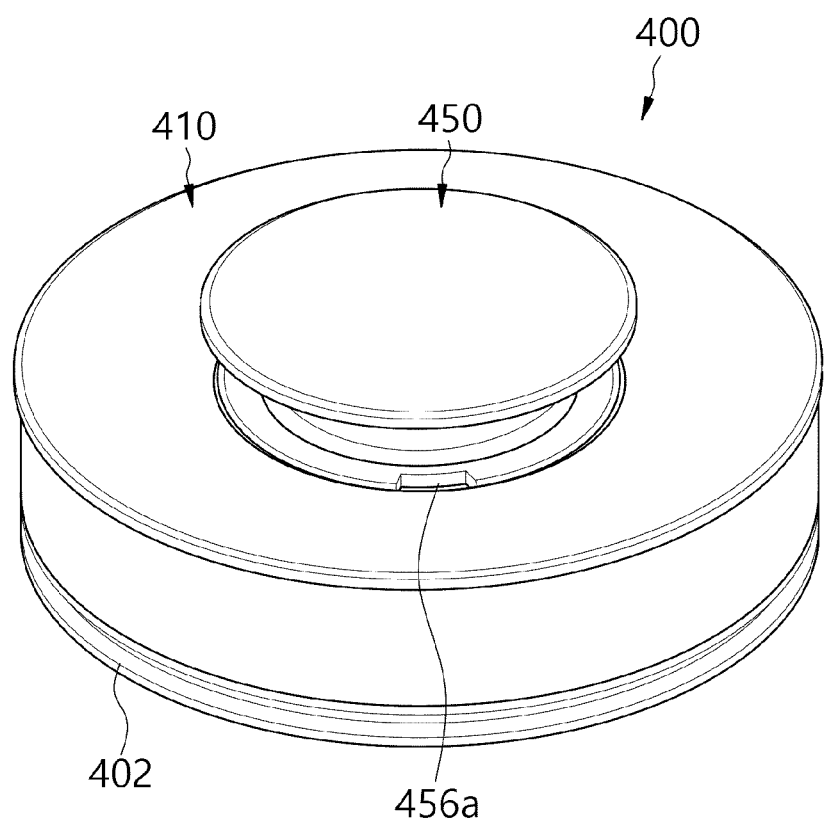
FIG. 5 is a perspective view illustrating an example of a container lid constituting the blender of the present disclosure according to the embodiment.

A ventilation groove 456a may be formed in the outer circumferential surface of the middle ring 456 by being recessed inward therefrom such that air flows to the upper and lower sides of the middle ring 456 through the ventilation groove. That is, the ventilation groove 456a may function to allow air to flow to the upper and lower sides of the middle ring 456 of the cap 450 through the ventilation groove. As illustrated in FIG. 5, the ventilation groove 456a may be formed by being recessed inward from the outer circumferential surface the middle ring 456.

A seating groove 424a may be formed in the upper end of the inner wall 424 such that the edge of the middle ring 456 sits therein. That is, as illustrated in FIG. 7, the seating groove 424a may be formed in the upper end of the inner surface of the inner wall 424 by being recessed outward therefrom to be stepped.

The inner circumferential surface of the seating groove 424a may be configured to have size corresponding to or larger than the size of the outer circumferential surface of the middle ring 456, and the inner diameter of the upper end of the inner wall 424 may have size smaller than the size of the outer diameter of the middle ring 456. Accordingly, the middle ring 456 may sit in the seating groove 424a, and may be supported thereby such that the middle ring 456 does not move toward the lower side of the inner wall 424.

As illustrated in FIG. 6, the outer wall 422 may be configured to have a vertical size corresponding to the vertical size of the inner wall 424, or to have a vertical size larger or smaller than the vertical size of the inner wall 424.

The locking means 440 may include a locking protrusion 442 formed by protruding from the lid body 410 to a side thereof, and a locking passage 444 formed in the cap 450 and receiving the locking protrusion 442. That is, the locking means 440 may include the locking protrusion 442 protruding inward from the inner circumferential surface of the lid body 410, and the locking passage 444 formed by being recessed inward from the outer circumferential surface of the cap 450 such that the locking protrusion 442 moves or is received therein.

Hereinafter, the structures and positions of the locking protrusion 442 and the locking passage 444 will be described in more detail.

The locking protrusion 442 may be formed by protruding inward from the inner surface of the inner wall 424. That is, the locking protrusion 442 may be formed at a position spaced apart by a predetermined distance upward from the lower end of the inner wall 424.

More specifically, a contact surface 424b may be formed on the inner surface of the inner wall 424 by protruding inward therefrom, the contact surface being in close contact with the outer surface of the cap body 454. That is, a portion of the lower half part of the inner wall 424 may be configured by protruding inward, and constitute the contact surface 424b. Such a contact surface 424b may be configured to have multiple contact surfaces on the inner wall 424. However, in the embodiment of the present disclosure, two contact surfaces are illustrated to be formed symmetrically to each other on the front and rear or the left and right of the inner wall 424.

The locking protrusion 442 may be formed by protruding inward from the contact surface 424b. That is, as illustrated in FIG. 9, the locking protrusion 442 may be formed by protruding inward (toward the center of the container lid) from the contact surface 424b, and may be formed at the position spaced apart by the predetermined distance upward from the lower end of the contact surface 424b.

A distance by which the locking protrusion 442 is spaced apart upward from the lower end of the cap body 454 or the contact surface 424b may correspond to the vertical length of an entrance groove 444a of the cap 450 to be described below.

Of course, the locking protrusion 442 may be formed on portions other than the contact surface 424b. The contact surface 424b may protrude inward from the inner wall 424, so in the case in which the locking protrusion 442 is formed on the inner surface of the inner wall 424 instead of the contact surface 424b, the protruding size of the locking protrusion 442 may be larger than in the case in which the locking protrusion 442 is formed on the contact surface 424b.

The locking protrusion 442 described above may formed to correspond to the locking passage 444 in number and position. Accordingly, the locking protrusion 442 may be formed to have at least one locking protrusion on the inner wall 424 or the contact surface 424b. However, in the embodiment of the present disclosure, two locking protrusions 442 are illustrated to be formed on the inner wall 424 or the contact surface 424b to face each other at positions thereof symmetrical to each other.

A return groove 424c may be formed at a side of the contact surface 424b by being recessed to the outside more than the contact surface 424b, the return groove being a path allowing food located on the contact surface 424b to fall downward. That is, the contact surfaces 424b may be configured to have two contact surfaces 424b formed by being divided at positions symmetrical to each other on the lower half part of the inner wall 424, and the return groove 424c may be formed between such two contact surfaces 424b.

The return groove 424c may have a shape recessed toward the outside more than the contact surface 424b, and the upper and lower parts thereof may be open. Accordingly, when food in the container body 100 splatters onto the contact surface 424b with the cap 450 mounted to the lid body 410, the food may fall downward through the return groove 424c and be introduced into the container body 100.

A return guide 424d may be provided on an end of the contact surface 424b such that the height of the upper end of the return guide gradually decreases toward a side thereof and thus the return guide may guide the movement of the food on the upper side of the contact surface 424b toward the return groove 424c.

Specifically, the return guide 424d may be slantingly formed at the opposite ends of the contact surface 424b, or at a left or right end thereof to have the height of the upper end thereof gradually decreasing toward the left or right. Accordingly, food positioned on the upper side of the contact surface 424b may slide down along the return guide 424d toward the return groove 424c, and finally fall down into the container body 100 located under the return groove 424c therethrough.

The locking passage 444 may be formed in the outer circumferential surface of the cap 450; provide the moving path of the locking protrusion 442; and maintain the received state of the locking protrusion 442 therein, so that the cap 450 may be coupled to the lid body 410.

The locking passage 444 may be formed by being recessed inward from the outer circumferential surface of the cap 450, and may include the entrance groove 444a guiding the vertical movement of the locking protrusion 442, and a locking groove 444b formed by extending horizontally from the end of the entrance groove 444a and supplying space to receive the locking protrusion 442.

Specifically, a pair of locking passages 444 may be formed in the outer circumferential surface of the lower end portion of the cap body 454. The number of such locking passages 444 may be the same as the number of the locking protrusions 442.

As illustrated in FIG. 8, the entrance groove 444a may be formed by extending upward from the lower end of the cap body 454. Such an entrance groove 444a may be formed to have a predetermined length upward from the inner surface of the lower end of the cap body 454. That is, the vertical length of the entrance groove 444*a* may correspond to a distance ranging from the lower end of the inner wall 424 to the locking protrusion 442.

The locking groove 444*b* may be formed by extending from the upper end of the entrance groove 444*a* to the left or right perpendicular thereto. That is, the entrance groove 444*a* may be formed vertically, but the locking groove 444*b* may be formed horizontally. Accordingly, the upper end of the entrance groove 444*a* may be connected to the left or right end of the locking groove 444*b*. Accordingly, the locking protrusion 442 may move while being received in the entrance groove 444*a* and the locking groove 444*b*.

A removal prevention protrusion 446 may be formed in the locking groove 444*b* by protruding therefrom to the outside, the removal prevention protrusion preventing the removal of the locking protrusion 442 received in the locking groove 444*b*. That is, as illustrated in FIG. 8, the removal prevention protrusion 446 having a predetermined size may be formed in the horizontally formed locking groove 444*b* by protruding therefrom to the outside.

The removal prevention protrusion 446 may be formed to vertically cross the locking groove 444*b*. The protruding size of such a removal prevention protrusion 446 may be formed to have size smaller than the depth of the locking groove 444*b*.

The removal prevention protrusion 446 may be formed at a position adjacent to the end of the locking groove 444*b*. FIG. 8 illustrates the removal prevention protrusion 446 formed at position adjacent to the right end of the locking groove 444*b*.

Furthermore, a reinforcement part 454*a* may be formed on the inner circumferential surface of the cap body 454 by protruding inward therefrom. That is, a side (the inner surface of the cap body) opposite to the position of the cap body 454 in which the locking passage 444 is formed may protrude inward. Accordingly, even when the locking passage 444 is formed in the outer circumferential surface of the cap body 454, the cap body 454 may maintain a predetermined thickness.

Meanwhile, as described above, in the blender of the present disclosure, the detection system may be provided so as to detect whether the container lid 400 is mounted to the container body 100. Such a detection system may include the permanent magnet 232 and the Hall sensor 234 provided at a side of the container lid 400 or the container body 100.

In addition, in the blender of the present disclosure, the permanent magnet 232 may be provided in the container lid 400, and the Hall sensor 234 is illustrated to be provided on a side of the container body 100 (a right side of the upper end thereof in FIGS. 13 and 14).

The permanent magnet 232 may include multiple permanent magnets provided at the same intervals. That is, the permanent magnet 232 may include multiple permanent magnets installed at the same intervals along the edge of the container lid 400.

The permanent magnet 232 may be fixed by the magnet holder 462.

Specifically, the magnet assembly 460 provided with the multiple permanent magnets 232 may be installed on the edge of the container lid 400. The magnet assembly 460 may be configured to have the shape of a circular ring, and may be installed in space between the second rib 420*b* and the third rib 420*c* of the lid casing 420.

The magnet assembly 460 may include the permanent magnets 232 and the magnet holder 462 supporting the permanent magnets 232. That is, the magnet holder 462 may be installed on the edge of the lower end of the lid casing 420, and the permanent magnets 232 may be received and installed at the same intervals in such a magnet holder 462.

The magnet holder 462 may have the magnet groove 464 formed therein such that the permanent magnet 232 is inserted into the magnet groove 464 from one side (an upper side in FIG. 12) thereof. As illustrated in FIG. 12, the magnet groove 464 may be configured to have an open upper side such that the permanent magnet 232 is inserted into and received in the magnet groove from the upper side thereof.

The magnet groove 464 and the permanent magnet 232 may have shapes corresponding to each other. Accordingly, the permanent magnet 232 may maintain a state inserted into the magnet groove 464 of the magnet holder 462.

The magnet holder 462 may be made of a material having elasticity. Accordingly, in a state in which the permanent magnet 232 is received in the magnet holder 462, the magnet holder 462 may be installed on the edge of the container lid 400 and may perform an airtight maintenance function in which external foreign matter is prevented from being introduced into the lid casing 420 from the lower end of the lid casing 420.

The magnet assembly 460 may be provided with a misassembly prevention means 465 such that each of the multiple permanent magnets 232 is received in a precise position of the magnet holder 462. That is, the misassembly prevention means 465 may be provided on at least any one side of the magnet groove 464 and the permanent magnet 232 so as to prevent the misassembly of the permanent magnet 232.

The misassembly prevention means 465 are required since the installation directions of the multiple permanent magnets 232 are required to be the same. That is, when the multiple permanent magnets 232 have N-S poles spaced apart at the same intervals from each other, the detection of magnetism by the Hall sensor 234 may be facilitated, and the attachment and detachment of the container lid 400 may be easily performed.

According to the present disclosure, the misassembly prevention means 465 is provided on each of the magnet groove 464 and the permanent magnet 232 such that the magnet groove 464 and the permanent magnet 232 correspond to each other. That is, the misassembly prevention means 465 may be a chamfer 465′ or a chamfered surface 465″ formed on the permanent magnet 232 or an edge (an edge of a left lower end in FIG. 12) of a side of the magnet groove 464.

Specifically, the chamfer 465′ may be formed on the edge of the left lower end of each of the multiple permanent magnets 232, and the chamfered surface 465″ may be formed on the edge of the left lower end (in FIG. 12) of each of the multiple magnet groove 464 of the magnet holder 462. Accordingly, the chamfer 465′ and the chamfered surface 465″ having shapes corresponding to each other may be formed respectively at corresponding positions of the permanent magnet 232 and the magnet groove 464. That is, as illustrated in FIG. 12, the chamfer 465′ and the chamfered surface 465″ configured as inclined surfaces may be formed on the left lower ends of the permanent magnet 232 and the magnet groove 464, respectively, such that the chamfer 465′ and the chamfered surface 465″ correspond to each other.

In this case, each of the multiple permanent magnets 232 may be installed in the magnet groove 464 so as to have the same left-to-right direction (in FIG. 12), so each of the multiple permanent magnets 232 may have an N-S pole of the same direction. That is, for example, when the chamfer 465′ described above is formed on the edge of the N pole of the permanent magnet 232, the N pole of the permanent magnet 232 may be constantly located on the chamfered surface 465" of the magnet groove 464.

The sealing packing 470 may be provided on the edge of the upper end of the lid casing 420.

As illustrated in FIG. 13, the sealing packing 470 may be installed in space between the upper end of the lid casing 420 and the first rib 420a and may be made of an elastic material such as rubber, so foreign matter may be prevented from being introduced into the upper end part of the lid exterior material 430.

Accordingly, the sealing packing 470 and the magnet holder 462 may function to maintain airtightness between the lid casing 420 and the lid exterior material 430.

The Hall sensor 234 may be installed on the upper end part of the handle 300 provided on a side of the container body 100. That is, as illustrated in FIG. 13, the handle 300 may be provided on the right upper end of the container body 100, and the Hall sensor 234 may be installed on the upper end part of such a handle 300.

More specifically, as illustrated in FIG. 13, a sensor support 238 may be installed in the mounting depression 236 formed in the upper end portion of the handle 300, and the Hall sensor 234 may be fixedly installed on such a sensor support 238. That is, the sensor support 238 may be fixedly installed vertically on the left end (in FIG. 13) of the handle 300, and the Hall sensor 234 may be installed on the left surface (in FIG. 13) of such a sensor support 238.

The Hall sensor 234 and the permanent magnets 232 may be installed to maintain an interval therebetween at which magnetism of at least one permanent magnet 232 of the multiple permanent magnets 232 is detected by the Hall sensor 234 when the container lid 400 is mounted to the container body 100. That is, as illustrated in FIGS. 13 and 14, the Hall sensor 234 and the permanent magnets 232 may be installed such that when the container lid 400 is accurately mounted to the precise position of the upper end of the container body 100, magnetism of a permanent magnet 232 located on the far right (in FIGS. 13 and 14) among the multiple permanent magnets 232 is detected by the Hall sensor 234. This is because when the container lid 400 is accurately mounted to the container body 100, this is required to be detected by the Hall sensor 234.

Contrarily, the Hall sensor 234 and each of the permanent magnets 232 may be installed to maintain an interval therebetween at which magnetism of at least one permanent magnet 232 of the multiple permanent magnets 232 is not detected by the Hall sensor 234 when the container lid 400 is not accurately mounted to the container body 100. That is, when the container lid 400 is not accurately mounted to the precise position of the upper end of the container body 100, magnetism of a permanent magnet 232 closest to the Hall sensor 234 among the multiple permanent magnets 232 is required to be prevented from being detected by the Hall sensor 234. This is because when the container lid 400 is recognized to be closed due to detection of magnetism of the permanent magnet 232 by the Hall sensor 234 in a case in which the container lid 400 is not accurately mounted to the container body 100, serious malfunction may occur.

More specifically, the Hall sensor 234 and each of the permanent magnets 232 may be installed to maintain an interval of 8.1 mm or less therebetween when the container lid 400 is mounted to the container body 100. That is, as illustrated in FIGS. 13 and 14, when the container lid 400 is mounted to the container body 100, a distance L between a permanent magnet 232 closest to the Hall sensor 234 among the multiple permanent magnets 232 and the Hall sensor 234 may be about 8.1 mm. This is the result obtained through a number of experiments, and when the distance L between at least one of the multiple permanent magnets 232 and the Hall sensor 234 is greater than 8.1 mm, the Hall sensor 234 may not accurately detect the closing of the container lid 400.

Figure 15:
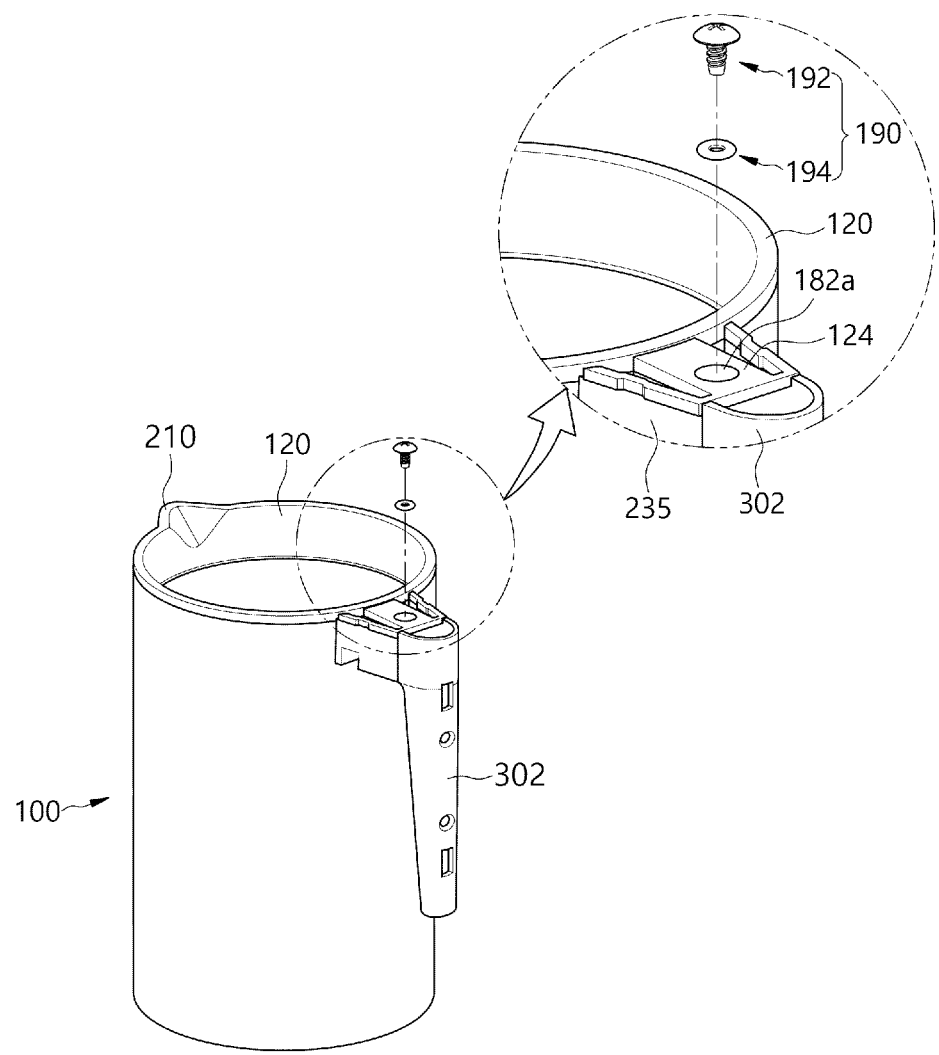
FIG. 15 is a perspective view illustrating the structure of the container body constituting the blender according to the embodiment of the present disclosure.
Figure 16:
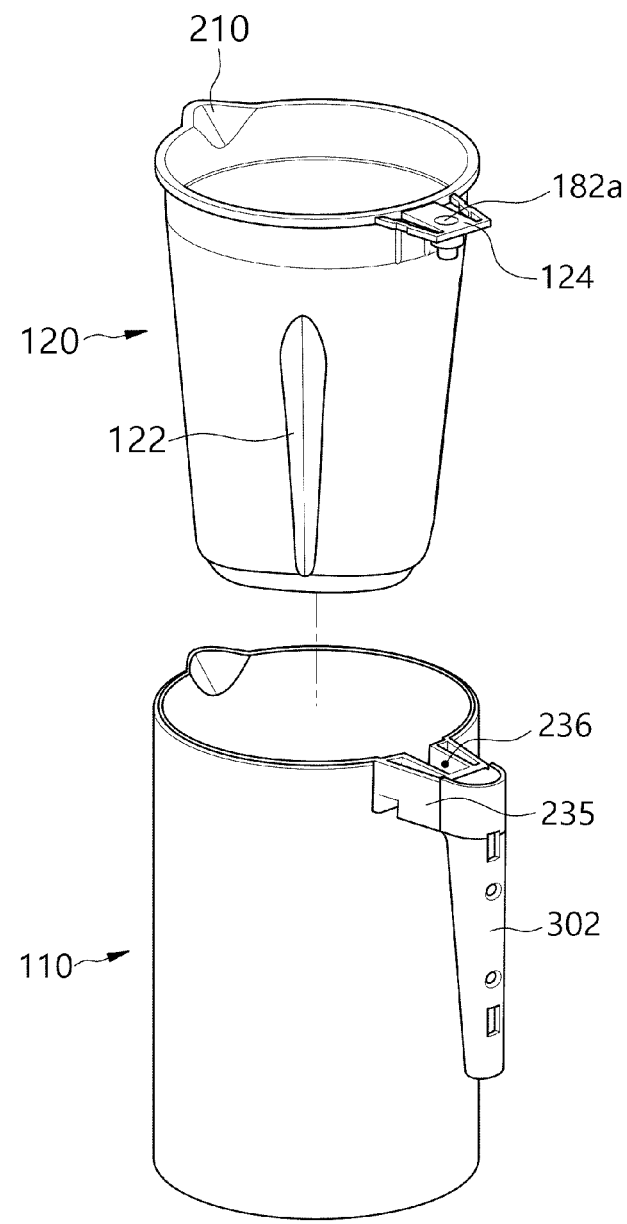
FIG. 16 is an exploded perspective view illustrating the structure of the container body constituting the blender according to the embodiment of the present disclosure.
Figure 17:
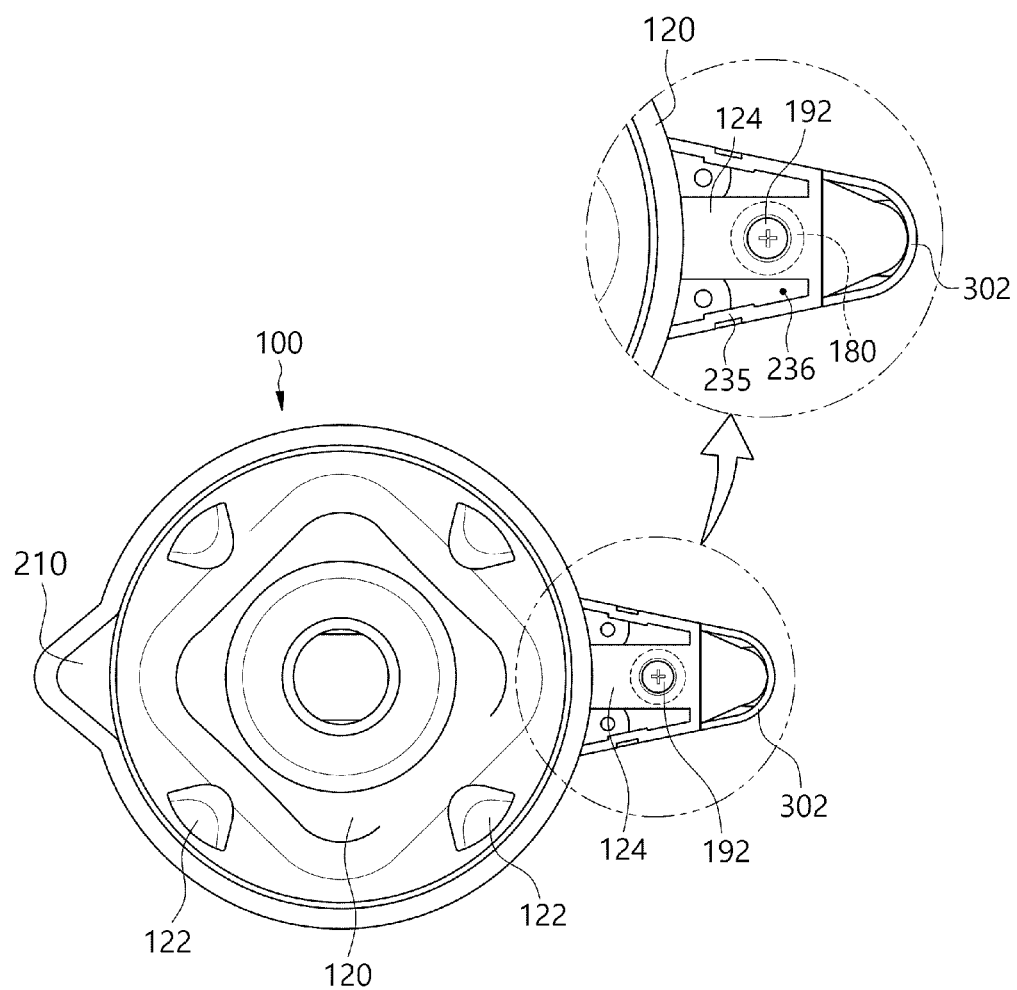
FIG. 17 is a top plan view illustrating the structure of the container body constituting the blender according to the embodiment of the present disclosure.
Figure 18:
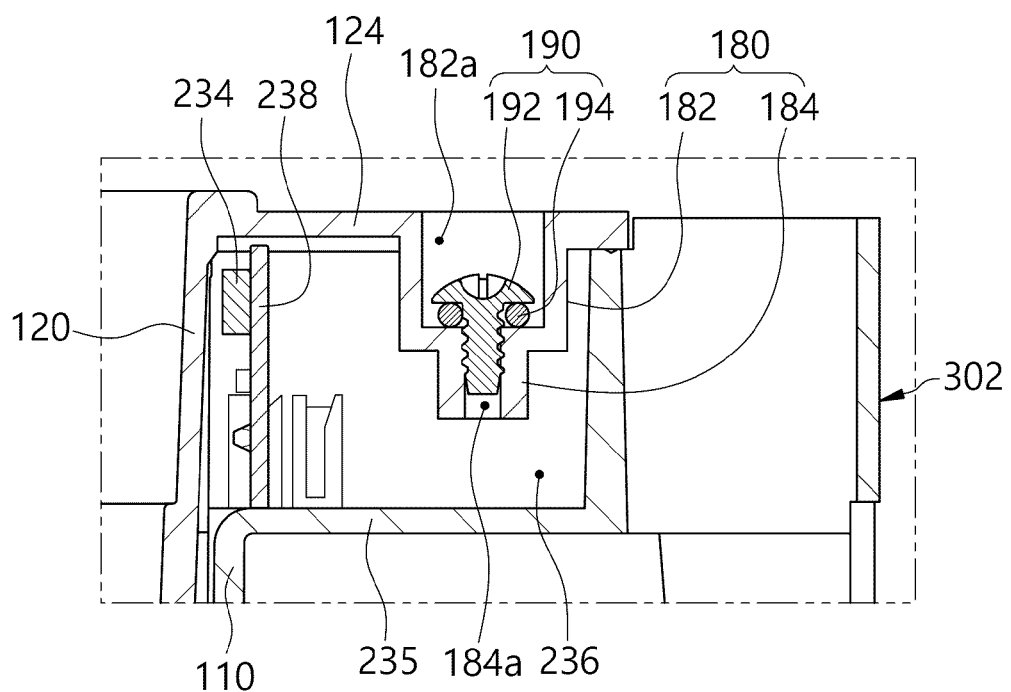
FIG. 18 is a partially enlarged sectional view illustrating an example of a state in which a guide end and a sealing part are provided in the container body constituting the blender according to the embodiment of the present disclosure.
Figure 19:
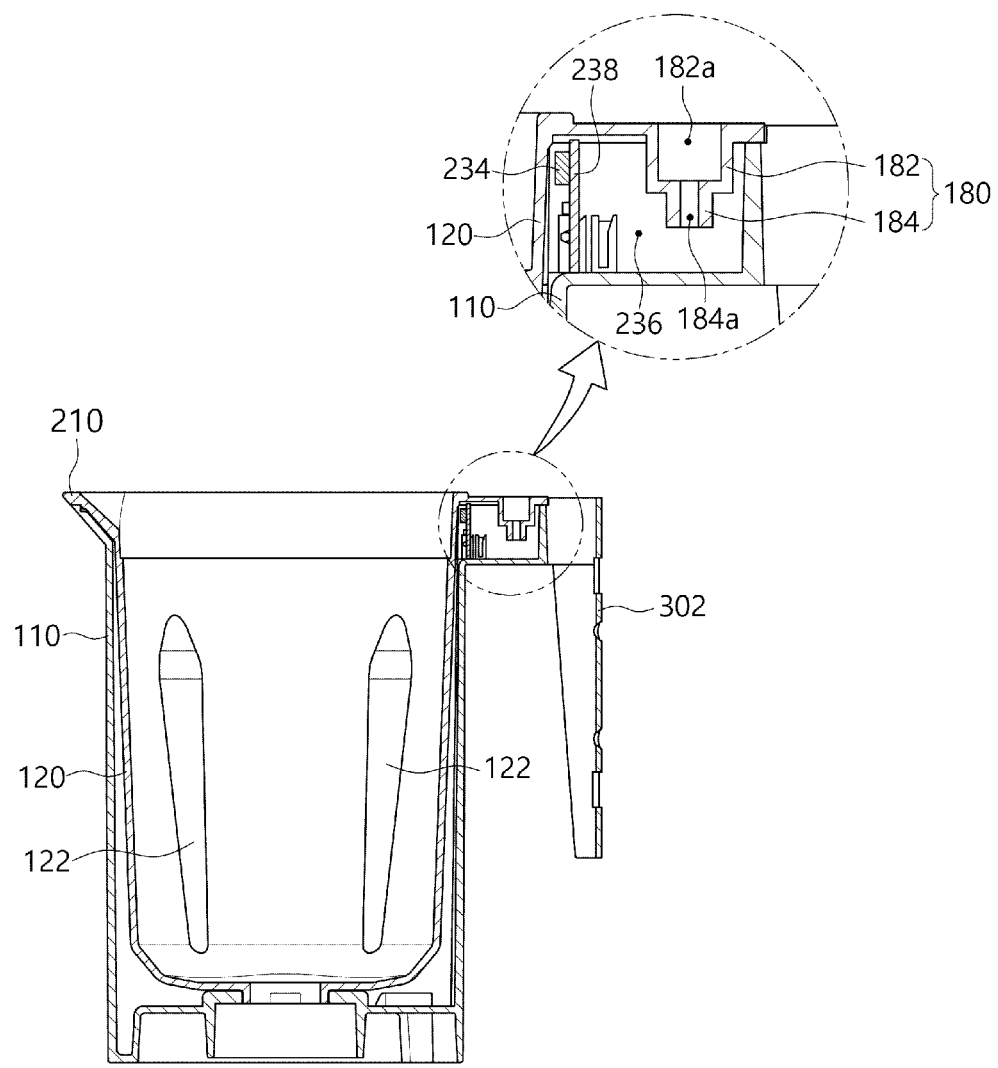
FIG. 19 is a front sectional view illustrating the internal configuration of the container body constituting the blender according to the embodiment of the present disclosure.
Figure 20:
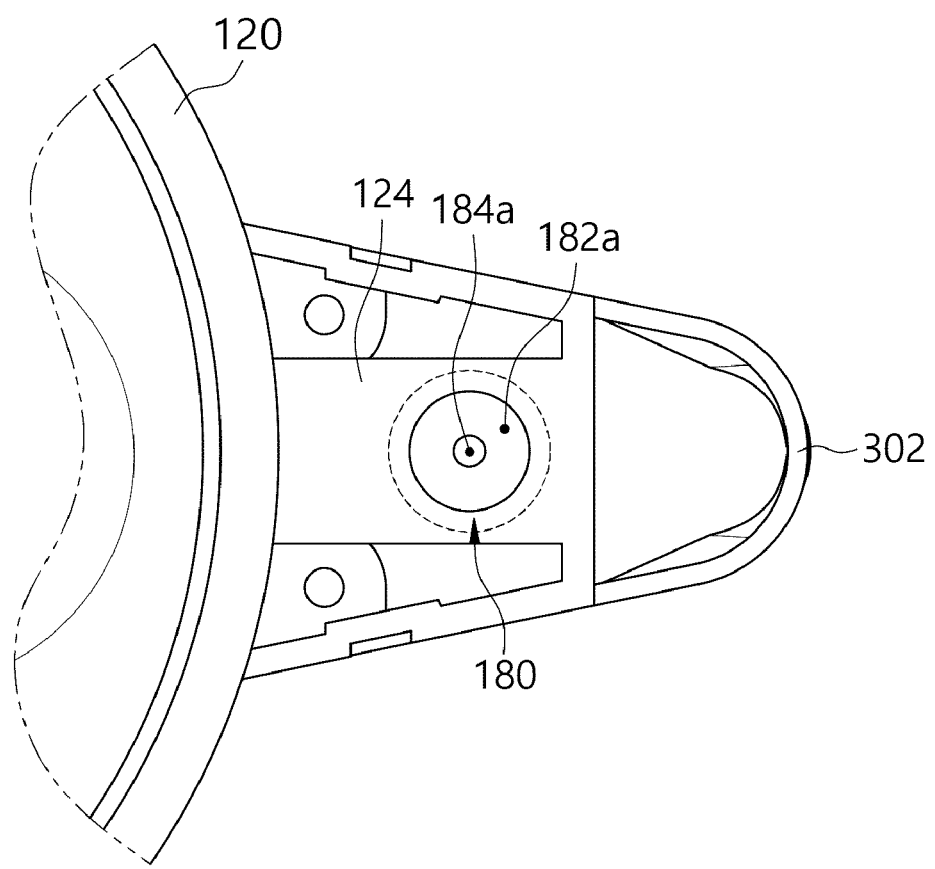
FIG. 20 is a partial top plan view illustrating an example of the guide end of the container body constituting the blender according to the embodiment of the present disclosure.

FIGS. 15 to 20 illustrate the configuration of the container body 100 and a pneumatic inspection structure. That is, FIGS. 15 and 16 illustrate a perspective view and an exploded perspective view, respectively, showing the structure of the container body 100, and FIG. 17 illustrates a top plan view showing the structure of the container body 100. Additionally, illustrates a partially enlarged FIG. 18 sectional view of an example of a guide end 180 and a sealing part 190 provided in the container body 100, FIG. 19 illustrates a front sectional view showing the internal configuration of the container body 100, and FIG. 20 illustrates a partial top plan view of an example of the guide end 180 formed in the container body 100.

As illustrated in these drawings, the container body 100 may be composed of the outer container body 110 constituting an exterior thereof, and the inner container body 120 provided inside the outer container body 110, wherein space between the outer container body 110 and the inner container body 120 may be blocked from the outside and be sealed. That is, various sensors or PCBs may be provided in the space between the outer container body 110 and the inner container body 120, and to protect these electronic parts from external foreign matter such as water, a gap between the outer container body 110 and the inner container body 120 may be closed by welding.

The mounting end 235 may be provided on an end of the container body 100 so as to provide space in which a sensor configured to detect whether the container lid 400 is mounted or a PCB is mounted. That is, the mounting end 235 may be provided on the upper end of the container body 100 by protruding rightward therefrom and extending, and the Hall sensor 234 or PCB may be installed in the mounting end 235.

Specifically, the mounting end 235 may be formed by extending laterally (rightward in FIGS. 17 to 19) from the upper end of the outer container body 110, and the mounting depression 236 in which a sensor or PCB is mounted may be formed in the mounting end 235. That is, the mounting depression 236 having a predetermined space may be formed in the mounting end 235, and the Hall sensor 234 or PCB may be mounted in the mounting depression 236.

The mounting depression 236 may be configured to be open in an upper side thereof, and the upper side of the mounting depression 236 may be covered by the covering end 124.

The covering end 124 may be formed on the upper end of the inner container body 120 by extending laterally therefrom. That is, the upper end of the inner container body 120 may include the covering end 124 formed thereon by extending rightward therefrom. The covering end 124 may be configured to have a predetermined thickness and may cover the upper side of the mounting depression 236. Additionally, the edge of such a covering end 124 may be coupled to the upper end of the mounting end 235 by welding or fusing.

The guide end 180 may be provided on a side of the container body 100 so as to guide the introduction of a fluid from the outside into space between the outer container body 110 and the inner container body 120. That is, the guide end 180 connected to a pipe or tube from the outside may be formed on the right side of the container body 100 so as to guide the introduction of external air into space between the outer container body 110 and the inner container body 120.

The guide end 180 may be formed on an end of the container body 100 and may be located inside the mounting end 235 which provides space in which a sensor configured to detect whether the container lid 400 is mounted or a PCB is mounted. That is, the guide end 180 may be located in the mounting depression 236 formed inside the mounting end 235.

More specifically, the guide end 180 may be provided on a side of the covering end 124 (a lower side thereof in FIGS. 18 and 19) so as to guide the introduction of a fluid from the outside into the mounting depression 236.

The guide end 180 may be configured to be stepped so as to guide the introduction of a fluid from the covering end 124 into the mounting depression 236. Additionally, the guide end 180 may be configured to have a cylindrical shape.

The guide end 180 may include a connecting part 182 formed by extending to a side from the covering end 124 (a lower side in FIG. 19), and an injection part 184 formed by extending to be stepped to a side (a lower side in FIG. 19) from the connecting part 182. That is, the connecting part 182 having a cylindrical shape with a diameter of a predetermined size may be formed on the lower side of the covering end 124, and the injection part 184 having a cylindrical shape having a size smaller than the size of the connecting part 182 may be formed on the lower side of such a connecting part 182.

The connecting part 182 may be a part to which a pipe or tube which guides a fluid such as air or water supplied from the outside is inserted and connected.

The injection part 184 may guide a fluid introduced through the pipe or tube coupled to the connecting part 182 into the mounting depression 236.

A fluid guided into the mounting depression 236 is intended to inspect whether the fluid is discharged through a gap between the mounting end 235, the outer container body 110, and the inner container body 120, and it is preferable that as the fluid, air is mainly used.

In addition, the guide end 180 described above may be formed to be integrated with the upper end of the handle 300. That is, as illustrated in FIG. 18, the guide end 180 may be formed on the upper end of the main handle 302 by bending perpendicularly therefrom and extending leftward.

The guide end 180 may be further provided with the sealing part 190 which blocks the flow of a fluid through the guide end 180. That is, after completing the process of inspecting of whether there is a gap between the mounting end 235, the outer container body 110, and the inner container body 120, foreign matter from the outside may be introduced through the guide end 180 into the mounting depression 236. Accordingly, the sealing part 190 for preventing this may be required.

Specifically, a connection hole 182*a* into which a connection tube from the outside is inserted may be formed inside the connecting part 182, and an injection hole 184*a* may be formed inside the injection part 184 by passing therethrough such that a fluid introduced through the connection hole 182*a* flows through the injection hole. That is, as described above, each of the connecting part 182 and the injection part 184 may have a cylindrical shape, and thus each of the connection hole 182*a* and the injection hole 184*a* may have a circular hollow shape. Additionally, the guide end 180 may be configured to be stepped, and thus the inner diameter of the injection hole 184*a* preferably has a size smaller than the inner diameter of the connection hole 182*a*.

The sealing part 190 may be configured to close the injection hole 184*a*. That is, the injection hole 184*a* is preferably selectively closed by the sealing part 190.

Specifically, after performing a pneumatic inspection of inspecting whether there is a gap between the mounting end 235, the outer container body 110, and the inner container body 120 by injecting air, the injection hole 184*a* may be closed by the sealing part 190.

The sealing part 190 may include a fastening member 192 fastened to or press-fitted into the injection hole 184*a*, and a sealing member 194 configured to close a gap between the fastening member 192 and the guide end 180.

Furthermore, the sealing member 194 may made of an elastic material. That is, the sealing member 194 may be configured as a circular ring made of an elastic material such as rubber and may close a gap between the fastening member 192 and the injection hole 184*a*.

In addition, the fastening member 192 may be configured as a fastening bolt, and in this case, a female thread corresponding to the male thread of the fastening bolt may be formed on the injection hole 184*a*. In this case, the fastening member 192 may be screwed and coupled to the injection hole 184*a*.

According to such a configuration, in the blender of the present disclosure, the detection of the container lid 400, and the inspection of whether there is a gap between the outer container body 110 and the inner container body 120 may be efficiently performed.

First, the operation of the blender of the present disclosure will be described.

When the container body 100 is seated on the main body 500, the blender is in a state of FIG. 1 and in this state, the blender of the present disclosure starts to be used.

First, in order for a user to use the blender, external power is required to be supplied to the blender, and this power supply may be wirelessly performed by the wireless power module 520. That is, power may be supplied to the blender from the outside by an induced electromotive force method. Of course, power may be supplied to the blender by wire.

Power of the wireless power module 520 may be supplied to parts, such as the motor assembly 600, the touch manipulation part 504, and the power transmission means 700 which require power, and a user may manipulate the starting or stopping of the blender by manipulating the touch manipulation part 504 or the knob 502.

For example, when a user intends to start crushing food by manipulating the touch manipulation part 504 or the knob 502, the motor assembly 600 is required to operate such that the blades of the blade assembly 200 rotate.

However, in this case, the detection system may determine whether the container lid 400 is closed, and when the container lid 400 is opened, the motor assembly 600 and the blade assembly 200 do not operate.

Specifically, when the container lid 400 is opened, magnetism may not be detected by the Hall sensor 234, and thus in the container body 100, the power reception means 220, the Hall sensor 234, and the light transmission module 810 may not form a closed circuit, and thus the light reception module 820 may not receive light. Accordingly, when the light reception module 820 does not receive light, power supply to the motor assembly 600 may be stopped by this signal.

However, when the container lid 400 is mounted to the container body 100, the permanent magnet 232 of the container lid 400 may approach the Hall sensor 234, and thus the Hall sensor 234 may detect magnetism of the permanent magnet 232, and accordingly, the power reception means 220, the Hall sensor 234, and the light transmission module 810 may formed a closed circuit, so the light reception module 820 may receive light generated by the light transmission module 810.

In this case, the closing of the container lid 400 may be detected, and according to a user's manipulation, the motor assembly 600 may start to operate such that food contained inside the container body 100 is crushed. Of course, in this case, whether the container body 100 is mounted to the main body 500 may also be detected such that the motor assembly 600 starts to operate.

In addition, in this case, the operation state of the blender of the present disclosure may be displayed to the outside through the display part 506, so a user may visually recognize the operation state of the blender or the period of operation time of the blender.

Meanwhile, since electronic parts such as various sensors or a PCB are installed between the outer container body 110 and the inner container body 120, it may be inspected whether there is a gap between the outer container body 110 and the inner container body 120. In this case, air may be introduced through the guide end 180 from the outside so as to perform a pneumatic inspection. That is, air may be introduced through the guide end 180 into the mounting depression 236 so as to inspect whether air leakage occurs due to a gap between the outer container body 110 and the inner container body 120.

When such an inspection is completed, the sealing part 190 may be used to close the injection hole 184a of the guide end 180. In this case, the introduction of external foreign matter through the guide end 180 may be prevented.

The scope of the present disclosure is not limited to the embodiment illustrated above, and many other modifications based on the present disclosure will be possible for those skilled in the art within the above technical scope.

For example, according to the present disclosure, the guide end 180 is illustrated to be integrated with the covering end 124. However, such a guide end 180 may be provided on the lower part or side surface of the mounting end 235.

In addition, the sealing part 190 may be made of one elastic material or may be configured to cover the connection hole 182a.

What is claimed is:

1. A blender comprising:
    a container body in which food is received;
    a main body configured to support the container body; and
    a container lid detachably mountable to an upper surface of the container body to open and close the upper surface of the container body,
    wherein the container body comprises:
    an outer container body constituting an exterior thereof, and an inner container body disposed inside the outer container body, wherein a space between the outer container body and the inner container body is selectively blocked from an outside of the container body; and
    a guide end disposed at a side of the container body and configured to guide a fluid introduced from outside of the container body into the space between the outer container body and the inner container body.

2. The blender of claim 1, wherein the container body comprises a mounting end disposed at an end of the container body so as to provide a space to mount at least one of a sensor to detect whether the container lid is mounted or a printed circuit board (PCB).

3. The blender of claim 2, wherein the mounting end extends laterally from an upper end of the outer container body, and a mounting depression to mount the at least one of the sensor or the PCB is formed inside the mounting end.

4. The blender of claim 3, wherein the mounting depression is opened at an upper side thereof, and a covering end covers the upper side of the mounting depression.

5. The blender of claim 4, wherein the covering end extends laterally from an upper end of the inner container body.

6. The blender of claim 1, wherein the container body comprises a mounting end disposed at the side of the container body and the guide end is disposed at the mounting end, the mounting end providing the space to mount at least one of a sensor to detect whether the container lid is mounted or a PCB.

7. The blender of claim 6, comprising a sealing part disposed at the guide end so as to block a flow of the fluid through the guide end.

8. The blender of claim 5, comprising a guide end disposed at the covering end so as to guide a fluid introduced from the outside of the container body into the mounting depression.

9. The blender of claim 8, wherein the guide end is stepped and guides the fluid from an upper end of the covering end into the mounting depression.

10. The blender of claim 9, wherein the guide end has a cylindrical shape.

11. The blender of claim 10, wherein the guide end comprises:
    a connecting part extending from the covering end, and
    an injection part extending from the connecting part and stepped.

12. The blender of claim 11, wherein the connecting part comprises a connection hole formed inside the connecting part, which is capable of receiving a connection tube, and the injection part comprises an injection hole formed inside the injection part and passing therethrough such that the fluid introduced through the connection hole flows through the injection hole.

13. The blender of claim 12, wherein the injection hole is selectively blocked by a sealing part.

14. The blender of claim 13, wherein the sealing part comprises:
    a fastening member to fasten to or to press-fit into the injection hole, and
    a sealing member to seal a gap between the fastening member and the guide end.

15. The blender of claim 14, wherein the sealing member is made of an elastic material.

16. The blender of claim 14, wherein the fastening member is configured as a fastening bolt, and a female thread corresponding to a male thread of the fastening bolt is formed in the injection hole.

* * * * *